US010250475B2

(12) United States Patent
He et al.

(10) Patent No.: US 10,250,475 B2
(45) Date of Patent: Apr. 2, 2019

(54) MEASUREMENT OF APPLICATION RESPONSE DELAY TIME

(71) Applicant: A10 Networks, Inc., San Jose, CA (US)

(72) Inventors: Yichao He, San Jose, CA (US); Yang Yang, San Jose, CA (US); Ali Golshan, Palo Alto, CA (US)

(73) Assignee: A10 Networks, Inc., San Jose, CA (US)

( * ) Notice: Subject to any disclaimer, the term of this patent is extended or adjusted under 35 U.S.C. 154(b) by 284 days.

(21) Appl. No.: 15/373,001

(22) Filed: Dec. 8, 2016

(65) Prior Publication Data

US 2018/0167298 A1 Jun. 14, 2018

(51) Int. Cl.
*H04L 12/26* (2006.01)
*H04L 29/12* (2006.01)
*H04L 29/08* (2006.01)

(52) U.S. Cl.
CPC ...... *H04L 43/0864* (2013.01); *H04L 61/1511* (2013.01); *H04L 67/1002* (2013.01)

(58) Field of Classification Search
CPC ............ H04L 43/0864; H04L 67/1002; H04L 61/1511
See application file for complete search history.

(56) References Cited

U.S. PATENT DOCUMENTS 4,001,819 A 1/1977 Wise
5,101,402 A 3/1992 Chiu et al.
(Continued)

FOREIGN PATENT DOCUMENTS

CN 1422468 A 6/2003
CN 104106241 A 10/2014
(Continued)

OTHER PUBLICATIONS

"How to Create a Rule in Outlook 2003" CreateaRule-Outlook2003. doc 031405 mad, 3 pages.
(Continued)

*Primary Examiner* — Ario Etienne
*Assistant Examiner* — Kidest Mendaye
(74) *Attorney, Agent, or Firm* — Keith Kline; The Kline Law Firm PC

(57) ABSTRACT

A method and system for measuring application response delay is described. The method may commence with receiving a Domain Name System (DNS) request from a client DNS server. The method may include measuring round trip time between the client DNS server and a first Global Server Load Balancing (GSLB) controller, between the first GSLB controller and a server load balancer (SLB) collocated with the first GSLB controller, and between the SLB and an application server. The method may further include receiving measurements of round trip time between the client DNS server and a second GSLB controller, between the second GSLB controller and an SLB collocated with the second GSLB controller, and between the second GSLB controller and a further application server. A cumulative response time associated with the application servers may be calculated based on the measurements to select an application server having a lowest cumulative response time.

20 Claims, 10 Drawing Sheets

(56) References Cited

U.S. PATENT DOCUMENTS

| | | |
|---|---|---|
| 5,163,088 A | 11/1992 | LoCascio |
| 5,359,659 A | 10/1994 | Rosenthal |
| 5,414,833 A | 5/1995 | Hershey et al. |
| 5,684,875 A | 11/1997 | Ellenberger |
| 5,940,002 A | 8/1999 | Finn et al. |
| 5,960,177 A | 9/1999 | Tanno |
| 6,088,804 A | 7/2000 | Hill et al. |
| 6,119,236 A | 9/2000 | Shipley |
| 6,205,115 B1 | 3/2001 | Ikebe et al. |
| 6,237,036 B1 | 5/2001 | Ueno et al. |
| 6,304,975 B1 | 10/2001 | Shipley |
| 6,324,286 B1 | 11/2001 | Lai et al. |
| 6,449,651 B1 | 9/2002 | Dorfman et al. |
| 6,519,703 B1 | 2/2003 | Joyce |
| 6,594,780 B1 | 7/2003 | Shen et al. |
| 6,715,081 B1 | 3/2004 | Attwood et al. |
| 6,732,279 B2 | 5/2004 | Hoffman |
| 6,735,702 B1 | 5/2004 | Yavatkar et al. |
| 6,754,832 B1 | 6/2004 | Godwin et al. |
| 6,757,822 B1 | 6/2004 | Feiertag et al. |
| 6,779,117 B1 | 8/2004 | Wells |
| 6,988,106 B2 | 1/2006 | Enderwick et al. |
| 7,159,237 B2 | 1/2007 | Schneier et al. |
| 7,194,766 B2 | 3/2007 | Noehring et al. |
| 7,222,366 B2 | 5/2007 | Bruton, III et al. |
| 7,296,283 B2 | 11/2007 | Hrastar et al. |
| 7,392,241 B2 | 6/2008 | Lin et al. |
| 7,418,733 B2 | 8/2008 | Connary et al. |
| 7,423,977 B1* | 9/2008 | Joshi .................. H04J 3/0682 370/231 |
| 7,543,052 B1 | 6/2009 | Cesa Klein |
| 7,565,549 B2 | 7/2009 | Satterlee et al. |
| 7,577,833 B2 | 8/2009 | Lai |
| 7,640,591 B1 | 12/2009 | Tripathi et al. |
| 7,653,633 B2 | 1/2010 | Villella et al. |
| 7,665,138 B2 | 2/2010 | Song et al. |
| 7,739,736 B1 | 6/2010 | Tripathi et al. |
| 7,809,131 B1 | 10/2010 | Njemanze et al. |
| 7,895,649 B1 | 2/2011 | Brook et al. |
| 8,037,532 B2 | 10/2011 | Haswell |
| 8,220,056 B2 | 7/2012 | Owens, Jr. |
| 8,239,670 B1 | 8/2012 | Kaufman et al. |
| 8,289,981 B1 | 10/2012 | Wei et al. |
| 8,301,802 B2 | 10/2012 | Wei et al. |
| 8,448,245 B2 | 5/2013 | Banerjee et al. |
| 8,478,708 B1 | 7/2013 | Larcom |
| 8,595,845 B2 | 11/2013 | Basavapatna et al. |
| 8,800,034 B2 | 8/2014 | McHugh et al. |
| 8,806,011 B1 | 8/2014 | Graham-Cumming |
| 8,813,228 B2 | 8/2014 | Magee et al. |
| 8,832,832 B1 | 9/2014 | Visbal |
| 9,215,208 B2 | 12/2015 | Fraize et al. |
| 2001/0042204 A1 | 11/2001 | Blaker et al. |
| 2002/0087708 A1 | 7/2002 | Low et al. |
| 2002/0188839 A1 | 12/2002 | Noehring et al. |
| 2003/0023846 A1 | 1/2003 | Krishna et al. |
| 2003/0028585 A1 | 2/2003 | Yeager et al. |
| 2003/0061507 A1 | 3/2003 | Xiong et al. |
| 2003/0069973 A1 | 4/2003 | Ganesan et al. |
| 2003/0135625 A1 | 7/2003 | Fontes et al. |
| 2003/0187688 A1 | 10/2003 | Fey et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0059943 A1 | 3/2004 | Marquet et al. |
| 2004/0059951 A1 | 3/2004 | Pinkas et al. |
| 2004/0059952 A1 | 3/2004 | Newport et al. |
| 2004/0093524 A1 | 5/2004 | Sakai |
| 2004/0111635 A1 | 6/2004 | Boivie et al. |
| 2004/0143751 A1 | 7/2004 | Peikari |
| 2004/0242200 A1 | 12/2004 | Maeoka et al. |
| 2005/0021999 A1 | 1/2005 | Touitou et al. |
| 2005/0036501 A1 | 2/2005 | Chung et al. |
| 2005/0041584 A1 | 2/2005 | Lau et al. |
| 2005/0044068 A1 | 2/2005 | Lin et al. |
| 2005/0044270 A1 | 2/2005 | Grove et al. |
| 2005/0108434 A1 | 5/2005 | Witchey |
| 2005/0210243 A1 | 9/2005 | Archard et al. |
| 2005/0257093 A1 | 11/2005 | Johnson et al. |
| 2006/0056297 A1 | 3/2006 | Bryson et al. |
| 2006/0061507 A1 | 3/2006 | Mohamadi |
| 2006/0143707 A1 | 6/2006 | Song et al. |
| 2006/0206936 A1 | 9/2006 | Liang et al. |
| 2006/0212522 A1 | 9/2006 | Walter et al. |
| 2006/0251057 A1 | 11/2006 | Kwon et al. |
| 2006/0253902 A1 | 11/2006 | Rabadan et al. |
| 2006/0256716 A1 | 11/2006 | Caci |
| 2006/0265585 A1 | 11/2006 | Lai |
| 2006/0288411 A1 | 12/2006 | Garg et al. |
| 2007/0056038 A1 | 3/2007 | Lok |
| 2007/0073660 A1 | 3/2007 | Quinlan |
| 2007/0291773 A1 | 12/2007 | Khan et al. |
| 2008/0183885 A1 | 7/2008 | Durrey et al. |
| 2008/0229418 A1 | 9/2008 | Chen et al. |
| 2008/0256623 A1 | 10/2008 | Worley et al. |
| 2009/0049198 A1 | 2/2009 | Blinn et al. |
| 2009/0070470 A1 | 3/2009 | Bauman et al. |
| 2009/0150996 A1 | 6/2009 | Haswell |
| 2009/0168995 A1 | 7/2009 | Banga et al. |
| 2009/0227228 A1 | 9/2009 | Hu et al. |
| 2009/0241190 A1 | 9/2009 | Todd et al. |
| 2009/0287941 A1 | 11/2009 | Shouno |
| 2010/0106833 A1 | 4/2010 | Banerjee et al. |
| 2010/0284300 A1 | 11/2010 | Deshpande et al. |
| 2010/0286998 A1 | 11/2010 | Picken |
| 2011/0026537 A1 | 2/2011 | Kolhi et al. |
| 2011/0029599 A1 | 2/2011 | Pulleyn et al. |
| 2011/0082917 A1 | 4/2011 | Szeto et al. |
| 2011/0093785 A1 | 4/2011 | Lee et al. |
| 2011/0131646 A1 | 6/2011 | Park et al. |
| 2011/0153744 A1 | 6/2011 | Brown |
| 2011/0249572 A1 | 10/2011 | Singhal et al. |
| 2012/0036272 A1 | 2/2012 | El Zur |
| 2012/0042060 A1 | 2/2012 | Jackowski et al. |
| 2012/0110472 A1 | 5/2012 | Amrhein et al. |
| 2012/0117646 A1 | 5/2012 | Yoon et al. |
| 2012/0163186 A1 | 6/2012 | Wei et al. |
| 2012/0174196 A1 | 7/2012 | Bhogavilli et al. |
| 2012/0226582 A1 | 9/2012 | Hammad |
| 2012/0307631 A1 | 12/2012 | Yang et al. |
| 2013/0019025 A1 | 1/2013 | Chaturvedi et al. |
| 2013/0124713 A1 | 5/2013 | Feinberg et al. |
| 2013/0128885 A1 | 5/2013 | Kardashov et al. |
| 2013/0139245 A1 | 5/2013 | Thomas |
| 2013/0173795 A1 | 7/2013 | McPherson |
| 2013/0198385 A1 | 8/2013 | Han et al. |
| 2013/0212265 A1 | 8/2013 | Rubio Vidales et al. |
| 2014/0006508 A1 | 1/2014 | Goyet et al. |
| 2014/0025568 A1 | 1/2014 | Smith et al. |
| 2014/0137190 A1 | 5/2014 | Carey et al. |
| 2014/0258489 A1 | 9/2014 | Muppala et al. |
| 2014/0258536 A1* | 9/2014 | Chiong ................ H04L 47/125 709/226 |
| 2014/0269308 A1 | 9/2014 | Oshiba |
| 2014/0280832 A1 | 9/2014 | Oshiba |
| 2014/0283065 A1 | 9/2014 | Teddy et al. |
| 2014/0298091 A1 | 10/2014 | Carlen et al. |
| 2014/0310396 A1 | 10/2014 | Christodorescu et al. |
| 2014/0325588 A1 | 10/2014 | Jalan et al. |
| 2015/0033341 A1 | 1/2015 | Schmidtler et al. |
| 2015/0088597 A1 | 3/2015 | Doherty et al. |
| 2015/0281104 A1* | 10/2015 | Golshan ............... H04L 47/283 370/238 |
| 2015/0312268 A1 | 10/2015 | Ray |
| 2015/0333988 A1 | 11/2015 | Jalan et al. |

FOREIGN PATENT DOCUMENTS

| | | |
|---|---|---|
| HK | 1198848 A | 6/2015 |
| TW | 375721 | 12/1999 |
| TW | 477140 B | 2/2002 |
| TW | 574655 B | 2/2004 |
| TW | 576066 B | 2/2004 |

(56) References Cited

FOREIGN PATENT DOCUMENTS

| TW | I225999 B | 1/2005 |
|---|---|---|
| TW | I252976 B | 4/2006 |
| WO | WO1998042108 A1 | 9/1998 |
| WO | WO2013112492 A1 | 8/2013 |
| WO | WO2014150617 A1 | 9/2014 |
| WO | WO2014151072 A1 | 9/2014 |
| WO | WO2014176461 A1 | 10/2014 |

OTHER PUBLICATIONS

"Oracle Intelligent Agent User's Guide," Oracle Corporation, Release 9.2.0, Part No. A96676-01, Mar. 2002, 36 pages.

"SOL11243: iRules containing the RULE_INIT iRule event do not re-initialize when a syntax error is corrected," F5 Networks, Inc., f5.support.com, May 24, 2010, 1 page.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Dainotti, Albert et al., "TIE: A Community-Oriented Traffic Classification Platform," May 11, 2009, Springer-Verlag, Traffic Monitoring and Analysis: Proceedings First International Workshop, TMA 2009. pp. 64-74. Retrieved from: Inspec. Accession No. 11061142.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

Guo, Yuan-ni et al., "An Embedded Firewall System Design Based on Ptolemy II," Journal of System Simulation, vol. 16 No. 6, pp. 1361-1363, Jun. 2004.

Huang, Quan et al., "An Embedded Firewall Based on Network Processor," IEEE, 2nd International Conference on Embedded Software and Systems, 7 pages, Dec. 16-18, 2005.

Ihde, Michael et al., "Barbarians in the Gate: An Experimental Validation of NIC-Based Distributed Firewall Performance and Flood Tolerance," IEEE, International Conference on Dependable Systems and Networks, Jun. 25-28, 2006, 6 pages.

Susilo, W. et al., "Personal Firewall for Pocket PC 2003: Design & Implementation," IEEE 19th International Conference on Advanced Information Networking and Applications, vol. 2 pp. 661-666, Mar. 28-30, 2005.

\* cited by examiner

MEASUREMENT OF APPLICATION RESPONSE DELAY TIME

TECHNICAL FIELD

This disclosure relates generally to data processing and more particularly to measuring application response delay time by distributed global server load balancing (GSLB) controllers.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A GSLB system may use a GSLB controller to balance workloads among multiple servers located at different geographical locations. When the GSLB system receives a session request from a local Domain Name System (DNS) server of a client, the GSLB system usually selects a server that has a minimum response time to the session request from the client. The GSLB controller may request server load balancers (SLBs) associated with each of the servers to send a DNS request to the client local DNS server. Upon receiving a response to the DNS request sent by the servers to the local DNS server, the response time of each of the servers may be determined. The GSLB controller may select the server having the minimum response time. However, a firewall placed between the local DNS server and the SLB can make the measuring of the response time of the server impossible.

Furthermore, in conventional technical solutions, the GSLB controller may select a server that is located at the same geographical location as the client. The GSLB controller usually performs matching of the geographical locations of the server and the client by determining a geographical location of the local DNS server of the client and matching the determined geographical location to a predetermined geographical location of the server. Only a single GSLB controller and a plurality of servers at the same geographical location are assumed to be provided to serve the geographical location of the client and the local DNS server. However, the demand for services may exceed the capacity of the single GSLB controller or the capacity of the plurality of servers at the same geographical location.

Moreover, in case of a distributed GSLB system having a plurality of GSLB controllers, each being co-located with a plurality of servers, if the local DNS server of the client sends the session request to one of the GSLB controllers, the servers co-located with the receiving GSLB controller may not provide the optimal choice for serving the client. In contrast, a server located elsewhere can provide a quicker response time.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for measuring application response delay. According to one of the approaches of the present disclosure, a system for measuring application response delay is provided. Specifically, the system for measuring application response delay may include a first GSLB controller and a second GSLB controller. The first GSLB controller and the second GSLB controller may be associated with a plurality of distributed GSLB controllers. The first GSLB controller may be operable to receive a DNS request from a client via a client DNS server. The DNS request may include a request to establish a session between the client and one of a plurality of application servers. The first GSLB controller may be operable to measure, in response to the receipt of the DNS request, a first round trip time (RTT) between the client DNS server and the first GSLB controller. The first GSLB controller may be further operable to measure a second RTT between the first GSLB controller and a first SLB collocated with the first GSLB controller. Furthermore, the first GSLB controller may be operable to measure a third RTT between the first SLB and at least one application server. The second GSLB controller may be operable to receive an instruction, from the first GSLB controller, to measure a first RTT between the client DNS server and the second GSLB controller, a second RTT between the second GSLB controller and a second SLB from the first GSLB controller, and a third RTT between the second SLB and the at least one further application server from the first GSLB controller. The second GSLB controller may be further operable to measure, in response to the instruction, the first RTT between the client DNS server and the second GSLB controller, the second RTT between the second GSLB controller and the second SLB in response to the instruction, and the third RTT between the second SLB and the at least one further application server in response to the instruction. The second GSLB controller may be operable to provide the measurements to the first GSLB controller. The first GSLB controller may further be operable to receive, from the second GSLB controller, a measurement of the first RTT between the client DNS server and the second GSLB controller. The first GSLB controller may be operable to receive, from the second GSLB controller, a measurement of the second RTT between the second GSLB controller and the second SLB collocated with the second GSLB controller. Furthermore, the first GSLB controller may be operable to receive, from the second GSLB controller, a measurement of the third RTT between the second SLB and at least one further application server. The first GSLB controller may be operable to calculate, based on the measurements, a cumulative response time associated with the at least one application server and a cumulative response time associated with the at least one further application server. Furthermore, the first GSLB controller may be operable to select, based on the calculation, an application server from the at least one application server and the at least one further application server. The selected application server may have a lowest cumulative response time from the cumulative response time associated with the at least one application server and the cumulative response time of the at least one further application server. The first GSLB controller may be further operable to send a DNS response to the client DNS server. The DNS response may be sent based on the selection of the application server. The DNS response may include network data of the SLB associated with the selected application server. The system may further include a database for storing the measurements associated with the first GSLB controller and the measurements associated with the second GSLB controller.

According to another approach of the present disclosure, a method for measuring application response delay is provided. The method may commence with receiving, by a first GSLB controller associated with a plurality of distributed GSLB controllers, a DNS request from a client via a client DNS server. The DNS request may include a request to establish a session between the client and one of a plurality of application servers. The method may continue with measuring, by the first GSLB controller, a first RTT between the client DNS server and the first GSLB controller. The method may continue with measuring, by the first GSLB controller, a second RTT between the first GSLB controller and a first SLB collocated with the first GSLB controller. The method may further include measuring, by the first GSLB controller, a third RTT between the first SLB and at least one application server. The method may further include receiving, by the first GSLB controller, from a second GSLB controller of the plurality of distributed GSLB controllers, a measurement of a first RTT between the client DNS server and the second GSLB controller. The method may continue with receiving, by the first GSLB controller, a measurement of a second RTT between the second GSLB controller and a second SLB collocated with the second GSLB controller from the second GSLB controller of the plurality of distributed GSLB controllers. The method may further include receiving, by the first GSLB controller, a measurement of a third RTT between the second SLB and at least one further application server from a second GSLB controller of the plurality of distributed GSLB controllers. The method may continue with calculating, by the first GSLB controller, a cumulative response time associated with the at least one application server and a cumulative response time associated with the at least one further application server. The calculation may be made based on the measurements performed by the first GSLB controller and the measurements received from the second GSLB controller. The method may further include selecting, by the first GSLB controller, an application server from the at least one application server and the at least one further application based on the calculation. The selected application server may have a lowest cumulative response time from the cumulative response time associated with the at least one application server and the cumulative response time of the at least one further application server. The method may include sending, by the first GSLB controller, a DNS response to the client DNS server. The DNS response may be sent based on the selection of the application server and may include network data of the SLB associated with the selected application server.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
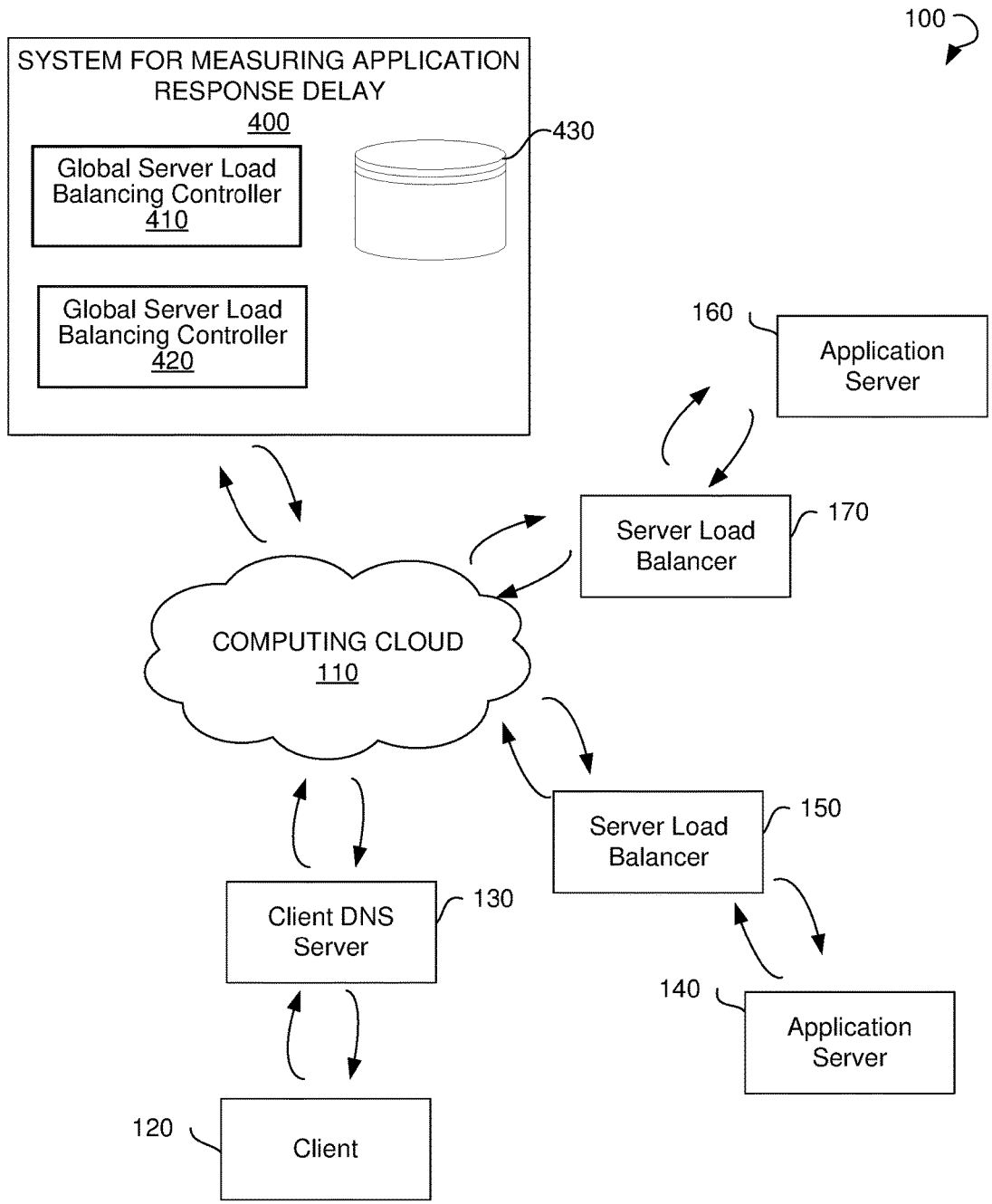
FIG. 1 shows an environment, within which methods and systems for measuring application response delay can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, a laptop computer), a game console, a handheld gaming device, a cellular phone, a smart phone, a smart television system, and so forth.

As outlined in the summary, the embodiments of the present disclosure are directed to measuring application response delay and selecting an application server based on the measured application response delay. A client may send a session request to establish a communication session with a server, such as an application server. A local DNS server, also referred to as a client DNS server, may receive the session request from the client and send the session request to a GSLB controller in a data network. The data network may have a plurality of distributed GSLB controllers, which can communicate with one another. For example, the distributed GSLB controllers may send requests to one another and maintain a common database.

Upon receipt of the session request, the GSLB controller may initiate measuring a response time for a plurality of servers in the data network. The response time of the server, also referred to as a time delay, a time distance, or a response delay, may include a RTT of sending a request between the client DNS server and the server. More specifically, measuring of the response time may include measuring of the response time between nodes located in the path between the client DNS server and the server. Firstly, the GSLB controller may measure a first RTT being a response time between the client DNS server and the GSLB controller. Secondly, the GSLB controller may measure a second RTT being a response time between the GSLB controller and an SLB collocated with the GSLB controller. Thirdly, the GSLB controller may measure a third RTT being a response time between the SLB and a server associated with the SLB. The GSLB controller may sum three measured values, namely, a first RTT, a second RTT, and a third RTT, to calculate a cumulative response time of the server.

Moreover, the GSLB controller may send requests to other GSLB controllers of the plurality of GSLB controllers to obtain response times associated with other servers of the data network. The GSLB controllers may measure a first RTT, a second RTT, and a third RTT associated with the client DNS server, SLBs collocated with the GSLB controllers, and a plurality of application servers associated with the SLBs, respectively. The GSLB controllers may provide the measurements to the GSLB controller. Based on the measurements, the GSLB controller may calculate cumulative response times of the plurality of servers.

Upon calculation of the cumulative response time, the GSLB controller may select a server having the shortest cumulative response time to serve the session with the client. Upon selection of the server, the GSLB controller may generate a response to the DNS request received from the client DNS server by adding a network address of an SLB associated with the selected server into the response. The GSLB controller may send the generated response to the client DNS server.

Referring now to the drawings, FIG. 1 illustrates an environment 100 within which methods and systems for measuring application response delay can be implemented. The environment 100 may include a data network, such as a computing cloud 110, a client 120, a client DNS server 130, an application server 140, an SLB 150 associated with the application server 140, an application server 160, an SLB 170 associated with the application server 160, and a system 400 for measuring application response delay (also referred to as a system 400). The client 120 may include one or more electronic devices associated with a client premises, such as a personal computer (PC), a laptop, a smartphone, a tablet PC, and so forth. The client 120 may be connected to the computing cloud 110 via the client DNS server 130.

The data network may be not limited to a computing cloud 110 but may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode (ATM) connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network may include a network of data processing nodes, also referred to as network nodes that are interconnected for the purpose of data communication.

The system 400 may include a first GSLB controller 410, a second GSLB controller 420, and a database 430. The first GSLB controller 410 and the second GSLB controller 420 may be collocated with SLBs, such as an SLB 150 and an SLB 170, respectively. Each of the SLB 150 and the SLB 170 may be associated with one or more application servers. More specifically, the SLB 150 may be associated with an application server 140 and the SLB 170 may be associated with an application server 160. The first GSLB controller 410 and the second GSLB controller 420 may be distributed GSLB controllers in the computing cloud 110. In fact, the system 400 may have a plurality of distributed GSLB controllers, each of which may be collocated with a plurality of SLBs. In turn, the plurality of SLBs may be associated with a plurality of application servers.

Figure 2:
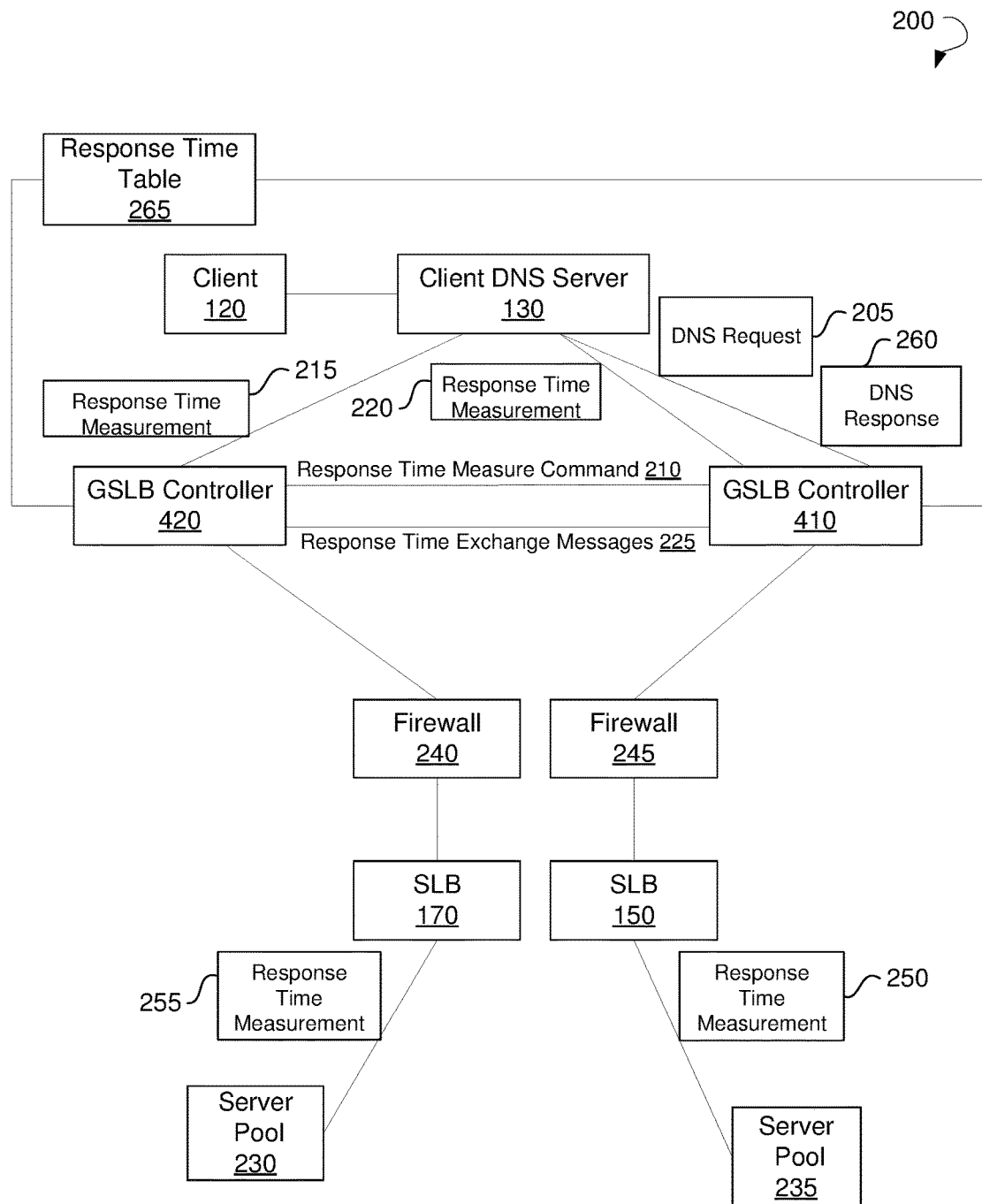
FIG. 2 is a block diagram illustrating measurement of application response delay by distributed GSLB controllers.

FIG. 2 is a block diagram 200 illustrating measurement of an application response delay by distributed GSLB controllers, according to an example embodiment. A first GSLB controller 410 may receive a DNS request 205 from a client DNS server 130. The DNS request 205 may be sent by a client 120 associated with the client DNS server 130. Upon receipt of the DNS request 205, the first GSLB controller 410 may send a command 210 to a second GSLB controller 420 to measure response time between the client DNS server 130 and the second GSLB controller 420, shown as a response time measurement 215. In response to the command 210, the second GSLB controller 420 may measure the response time requested by the first GSLB controller 410. Additionally, in response to the receipt of the DNS request 205, the first GSLB controller 410 may measure response time between the client DNS server 130 and the first GSLB controller 410, shown as a response time measurement 220. The second GSLB controller 420 may exchange the response time with the first GSLB controller 410 using response time exchange messages 225. The first GSLB controller 410 and the second GSLB controller 420 may maintain the same response time table 265. More specifically, the first GSLB controller 410 and the second GSLB controller 420 may store the response time measurement 220 and the response time measurement 215 to the response time table 265.

Each of the first GSLB controller 410 and the second GSLB controller 420 may be collocated with an SLB, such as an SLB 150 and an SLB 170, respectively. The SLB 150 and the SLB 170 may be separated from the first GSLB controller 410 and the second GSLB controller 420 via a firewall, such as a firewall 240 and a firewall 245.

Additionally, the response time table 265 may include server time delays. The server time delays may include response time between the SLB 170 and server pool 230 associated with the SLB 170 (shown as a response time measurement 255) and the SLB 150 and a server pool 235 associated with the SLB 150 (shown as a response time measurement 250). Each of server pool 230 and the server pool 235 may include a plurality of application servers. The response time measurement 250 and the response time measurement 255 may be measured during previous sessions between the client 120 and one of the application servers and may be stored in the response time table 265.

The first GSLB controller 410 may use the response time measurement 220 and the response time measurement 250 to calculate a cumulative response time of one or more application servers of the server pool 235 associated with the SLB 150. Furthermore, the first GSLB controller 410 may use the response time measurement 215 and the response time measurement 255 to calculate a cumulative response time of one or more application servers of the server pool 230 associated with the SLB 170. Based on the calculation, the first GSLB controller 410 may select an application server having a shortest cumulative response time. Based on the selection, the first GSLB controller 410 may send a DNS response 260 to the client DNS server 130. The DNS response 260 may include at least network data of an SLB associated with the selected application server, such as the network data of the SLB 150 if the application server is selected from the server pool 235 and the network data of the SLB 170 if the application server is selected from the server pool 230.

Figure 3:
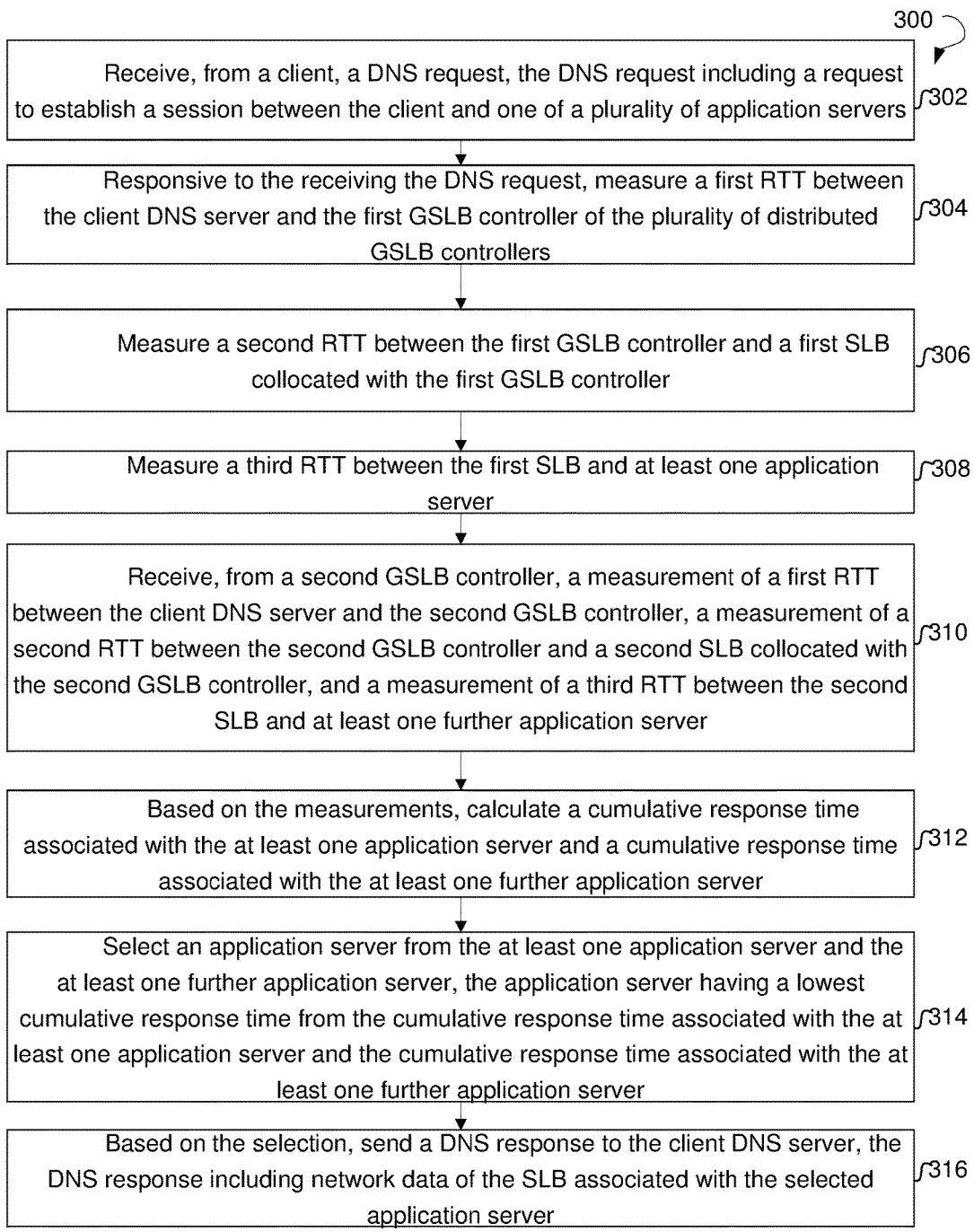
FIG. 3 is a flow diagram illustrating a method for measuring application response delay.

FIG. 3 shows a process flow diagram of a method 300 for measuring application response delay, according to an example embodiment. In some embodiments, operations of the method 300 may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with receiving a DNS request from a client at operation 302. The DNS request may be received by a first GSLB controller associated with a plurality of distributed GSLB controllers. More specifically, a client DNS server may receive the DNS request of the client and forward the DNS request to the first GSLB controller. In an example embodiment, the DNS request may include a request to establish a session between the client and one of a plurality of application servers.

In response to the receipt of the DNS request, the first GSLB controller may measure a first RTT between the client DNS server and the first GSLB controller at operation 304. More specifically, the first RTT may include the RTT of sending the DNS request between the first GSLB controller and the client DNS server and receiving a response to the DNS request. At operation 306, the first GSLB controller may measure a second RTT between the first GSLB controller and a first SLB collocated with the first GSLB controller. The method 300 may continue with operation 308, at which the first GSLB controller may measure a third RTT between the first SLB and at least one application server. In an example embodiment, the second RTT between the first GSLB controller and the first SLB and the third RTT between the first SLB and the at least one application server may be measured by any suitable techniques.

In an example embodiment, the first GSLB controller and the second GSLB controller may be operable to exchange requests. The first GSLB controller may further request the second GSLB controller to measure the first RTT between the client DNS server and the second GSLB controller, the second RTT between the second GSLB controller and the second SLB collocated with the second GSLB controller, and the third RTT between the second SLB and the at least one further application server.

At operation 310, the first GSLB controller may receive measurements from a second GSLB controller of the plurality of distributed GSLB controllers. More specifically, the first GSLB controller may receive a measurement of a first RTT between the client DNS server and the second GSLB controller, a measurement of a second RTT between the second GSLB controller and a second SLB collocated with the second GSLB controller, and a measurement of a third RTT between the second SLB and at least one further application server.

The method 300 may continue with operation 312, at which the first GSLB controller may calculate a cumulative response time associated with the at least one application server and a cumulative response time associated with the at least one further application server. The calculation may be performed based on the measurements performed by the first GSLB controller and the measurements received from the second GSLB controller. In an example embodiment, the calculation of the cumulative response time associated with the at least one application server includes summing the first RTT between the client DNS server and the first GSLB controller, the second RTT between the first GSLB controller and the first SLB, and the third RTT between the first SLB and the at least one application server. In a further example embodiment, the calculation of the cumulative response time associated with the at least one further application server includes summing the first RTT between the client DNS server and the second GSLB controller, the second RTT between the second GSLB controller and the second SLB, and the third RTT between the second SLB and the at least one further application server.

Based on the calculation, the first GSLB controller may select, at operation 314, an application server having a lowest cumulative response time from the at least one application server and the at least one further application server. More specifically, the first GSLB controller may compare the cumulative response time associated with the at least one application server and the cumulative response time associated with the at least one further application server and select the application server having the shortest cumulative response time.

At operation 316, the first GSLB controller may send a DNS response to the client DNS server. In an example embodiment, the DNS response may include network data of the SLB associated with the selected application server.

In a further example embodiment, the method 300 may include maintaining a response time table in a database by the first GSLB controller, the second GSLB controller, and each of the plurality of GSLB controllers. The measurements and the cumulative response time may be stored in the response time table. In some embodiments, upon receipt of the DNS request, the first GSLB controller may search for the cumulative response time associated with the client DNS server in the database. The cumulative response time may be stored in the database during previous sessions between the client and one of the application servers.

In some example embodiments, the method 300 may include periodically measuring a RTT between each of the plurality of GSLB controllers and each of the SLBs collocated with each of the plurality of GSLB controllers. The periodically measured RTT may be stored to the database.

In an example embodiment, upon receipt of the DNS request, the first GSLB controller may determine a type of the session requested to be established by the client. The type of the session may be determined based on a domain name included into the DNS request. The domain name may include a string selected from a group comprising: a Hypertext Transfer Protocol (HTTP), a File Transfer Protocol (FTP), a Session Initiation Protocol (SIP), a voice over Internet protocol (VoIP), a web, a file, a mail, a Post Office Protocol (POP), an exchange, an email, and so forth. Upon determination of the type of the session, the first GSLB controller may request, from each of the first SLB and the second SLB, a processing time of each of the application servers associated with the first SLB and the second SLB. The processing time may include time needed for each of the application servers to process the session of a specific type, such as to process an HTTP session, an FTP session, and the like. In response to the request, the first GSLB controller may receive the processing time associated with each of the at least one application server and the at least one further application server. Upon receipt of the processing time, the first GSLB controller may add the processing time to the cumulative response time for each of the application servers.

Figure 4:
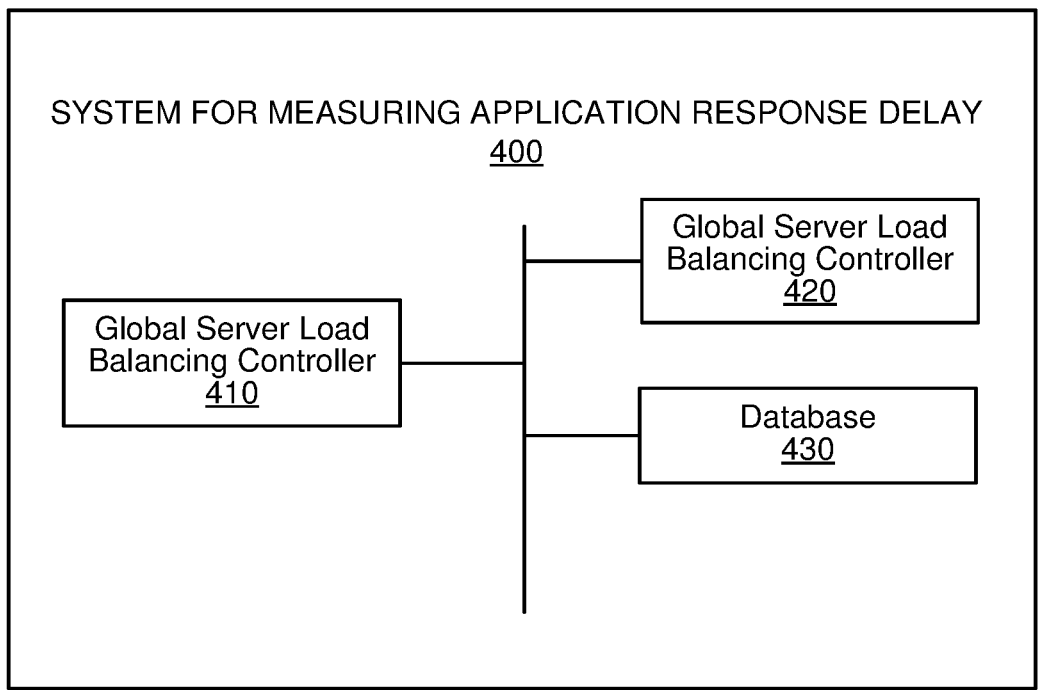
FIG. 4 is a block diagram illustrating various modules of a system for measuring application response delay.

FIG. 4 shows a block diagram illustrating various modules of a system 400 for measuring application response delay, according to an example embodiment. Specifically, the system 400 may include a first GSLB controller 410, a second GSLB controller 420, and a database 430. The first GSLB controller 410 and the second GSLB controller 420 may be associated with a plurality of distributed GSLB controllers in the system 400. Furthermore, the first GSLB controller 410 and the second GSLB controller 420 may be operable to exchange requests.

The first GSLB controller 410 may be operable to receive a DNS request from a client via a client DNS server. In an example embodiment, the DNS request may include a request to establish a session between the client and one of a plurality of application servers. The first GSLB controller 410 may be operable to measure, in response to the receipt of the DNS request, a first RTT between the client DNS server and the first GSLB controller 410 of the plurality of distributed GSLB controllers. Furthermore, the first GSLB controller 410 may be operable to measure a second RTT between the first GSLB controller 410 and a first SLB collocated with the first GSLB controller 410, and to measure a third RTT between the first SLB and at least one application server.

Moreover, the first GSLB controller 410 may be operable to request the second GSLB controller 420 to measure a first RTT between the client DNS server and the second GSLB controller 420, a second RTT between the second GSLB controller 420 and a second SLB collocated with the second GSLB controller, the third RTT between the second SLB and the at least one further application server.

The second GSLB controller 420 may be operable to receive, from the first GSLB controller 410, an instruction to measure the first RTT between the client DNS server and the second GSLB controller 420, the second RTT between the second GSLB controller 420 and the second SLB, and the third RTT between the second SLB and the at least one further application server. The second GSLB controller 420 may be operable to measure, in response to the instruction, the requested first RTT, second RTT, and third RTT. The second GSLB controller 420 may provide the measurements to the first GSLB controller 410.

The first GSLB controller 410 may be operable to receive, from the second GSLB controller 420, a measurement of a first RTT between the client DNS server and the second GSLB controller 420, a measurement of a second RTT between the second GSLB controller 420 and the second SLB collocated with the second GSLB controller 420, and a measurement of a third RTT between the second SLB and at least one further application server.

Based on the measurements, the first GSLB controller 410 may calculate a cumulative response time associated with the at least one application server and a cumulative response time associated with the at least one further application server. Based on the calculation, the first GSLB controller 410 may select an application server from the at least one application server and the at least one further application server. The selected application server may have a lowest cumulative response time from the cumulative response time associated with the at least one application server and the cumulative response time of the at least one further application server. In an example embodiment, the calculation of the cumulative response time associated with the at least one application server may include summing of the first RTT between the client DNS server and the first GSLB controller 410, the second RTT between the first GSLB controller 410 and a first SLB, and a third RTT between the first SLB and the at least one application server. In a further example embodiment, the calculation of the cumulative response time associated with the at least one further application server may include summing of the first RTT between the client DNS server and the second GSLB controller 420, the second RTT between the second GSLB controller 420 and the second SLB, and the third RTT between the second SLB and the at least one further application server.

The first GSLB controller 410 may be further operable to send a DNS response to the client DNS server based on the selection of the application server. In an example embodiment, the DNS response may include network data of the SLB associated with the selected application server.

The database 430 may be operable to store the measurements associated with the first GSLB controller 410 and the measurements associated with the second GSLB controller 420. In an example embodiment, the first GSLB controller 410, the second GSLB controller 420, and each of the plurality of GSLB controllers of the system 400 may be operable to maintain a response time table in the database 430 to store the cumulative response time and the measurements performed by each of the plurality of GSLB controllers.

Furthermore, the first GSLB controller 410 may be operable to periodically measure, or instruct to measure, a RTT between each of the plurality of GSLB controllers and each of the SLBs collocated with each of the plurality of GSLB controllers. The measured RTT may be stored to the database 430.

In a further example embodiment, the first GSLB controller 410 may be operable to determine a type of the session requested by the client to be established. The type of the session may be determined based on a domain name included into the DNS request. More specifically, the domain name may include a string selected from a group comprising: an HTTP, an FTP, a SIP, a VoIP, a web, a file, a mail, a POP, an exchange, an email, and so forth. The type of the session may be determined based on the string included in to the domain name.

Upon determining of the type of the session, the first GSLB controller 410 may request, from the SLBs collocated with each of the plurality of GSLB controllers of the system 400, a processing time of application servers associated with the SLBs. The processing time may include time needed for each of the application servers to process the session having the determined type of the session. In response to the request, the first GSLB controller 410 may receive the processing time associated with each of the application servers. Upon receipt of the processing time, the first GSLB controller 410 may sum the cumulative response time and the processing time for each of the application servers to obtain a summarized response and processing time. The summarized response and processing time may be stored to the database 430 and may be used by the first GSLB controller 410 for selection of the application server. More specifically, the SLB associated with an application server having the lowest summarized response and processing time may be selected for serving the session requested by the client.

Figure 5:
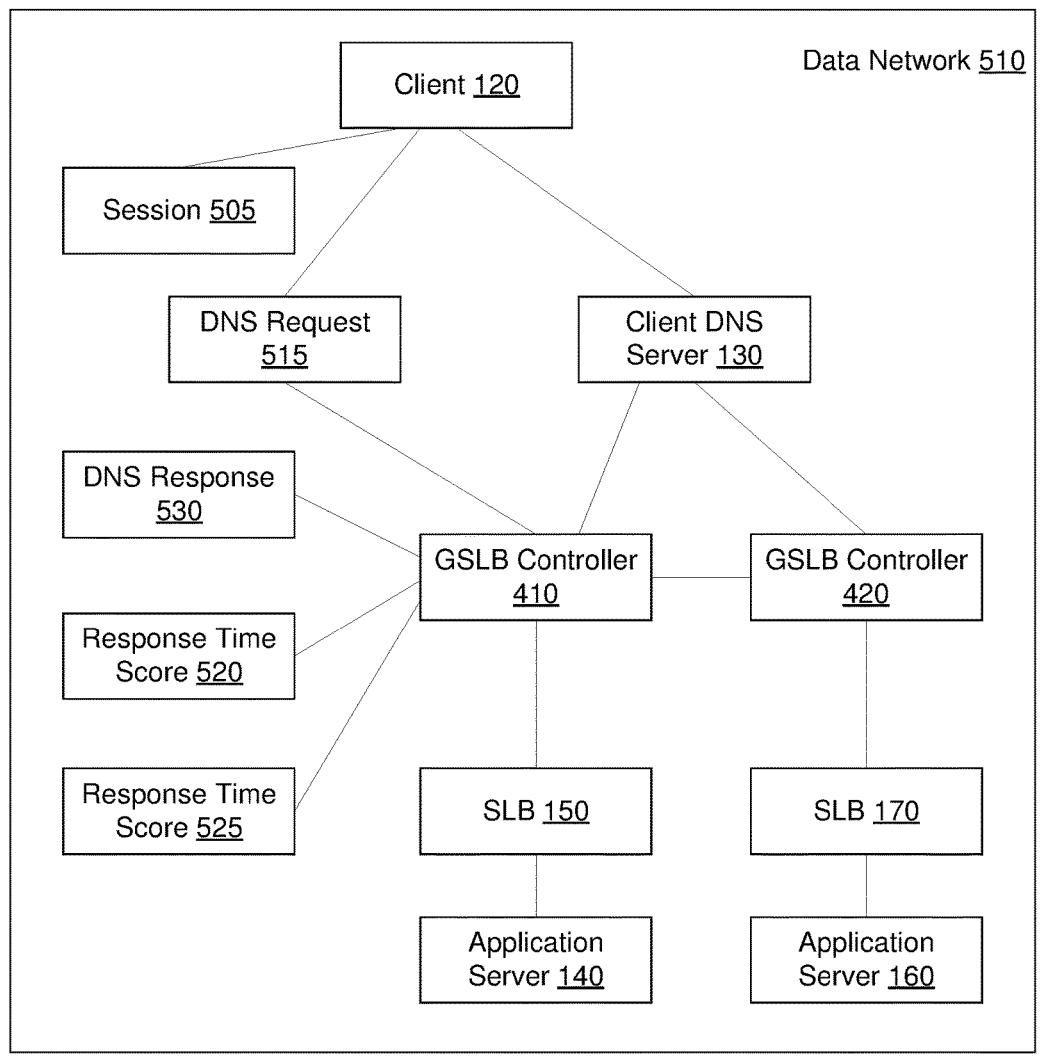
FIG. 5 is a block diagram illustrating processing a DNS request by a system for measuring application response delay.

FIG. 5 is a block diagram 500 illustrating processing a DNS request by a system for measuring application response delay, according to an example embodiment. A client device shown as a client 120 may request to establish a data communication session shown as a session 505 with a server over a data network 510. To establish the session 505, the client 120 sends a DNS request 515 to a client DNS server 130 to look for a network address associated with the server. In an example embodiment, the client DNS server 130 may relay the DNS request 515 to a first GSLB controller shown as a GSLB controller 410. The GSLB controller 410 may receive the DNS request 515. The GSLB controller 410 may further connect to an SLB 150, which connects to one or more servers, such as an application server 140. In an example embodiment, a GSLB controller 420 may connect to an SLB 170, which in turn may connect to a plurality of servers, such as an application server 160. The application server 140 and the application server 160 may be operable to serve the session 505, and the GSLB controller 410 may be configured to select the application server 160 via the SLB 150, or the application server 160 via the SLB 170 in response to the receipt of the DNS request 515.

In an example embodiment, upon receipt of the DNS request 515 from the client DNS server 130, the GSLB controller 410 may determine a response time score 520 being a cumulative response time, namely the sum of a response time related to the client DNS server 130 and a response time related to the SLB 150. More specifically, the response time related to the client DNS server 130 may include a RTT of a request sent by the GSLB controller 410 to the client DNS server 130 and sent by the client DNS server 130 back to the GSLB controller 410. The response time related to the SLB 150 may include a RTT of a request sent by the GSLB controller 410 to the SLB 150 and sent by the SLB 170 back to the GSLB controller 420.

Additionally, the GSLB controller 410 may send a request to the GSLB controller 420 to collect response time related to the client DNS server 130 and response time related to the SLB 170. More specifically, the response time related to the client DNS server 130 may include a RTT of a request sent by the GSLB controller 420 to the client DNS server 130 and sent by the client DNS server 130 back to the GSLB controller 420. The response time related to the SLB 170 may include a RTT of a request sent by the GSLB controller 420 to the SLB 170 and sent by the SLB 170 back to the GSLB controller 420. The GSLB controller 410 may receive the collected response time information from the GSLB controller 420 and may determine a response time score 525 associated with the GSLB controller 420. The response time score 525 may be a cumulative response time, namely a sum of the response time between the GSLB controller 420 and the client DNS server 130 and the response time between the GSLB controller 420 and the SLB 170. The GSLB controller 410 may compare the response time score 520 and the response time score 525. Based on the comparison, the GSLB controller 410 may determine that the response time score 520 is more optimal than the response time score 525. In an example embodiment, the more optimal response time score is selected based on the shortest cumulative response time. The GSLB controller 410 may select the SLB 150 and include a network address of the SLB 150 into a DNS response 530 to be sent to the client DNS server 130.

In another example embodiment, the GSLB controller 410 may determine that the response time score 525 is more optimal than the response time score 520. The GSLB controller 410 may select the SLB 170 and include a network address of the SLB 170 into the DNS response 530. The GSLB controller 410 may send the DNS response 530 to the client DNS server 130. The client DNS server 130 may relay the DNS response 530 to the client 120.

The client 120 may retrieve the network address from the DNS response 530 and establish the session 505 based on the network address retrieved from the DNS response 530. The SLB 150 or the SLB 170 may select the application server 140 or the application server 160, respectively, to serve the session 505.

Figure 6:
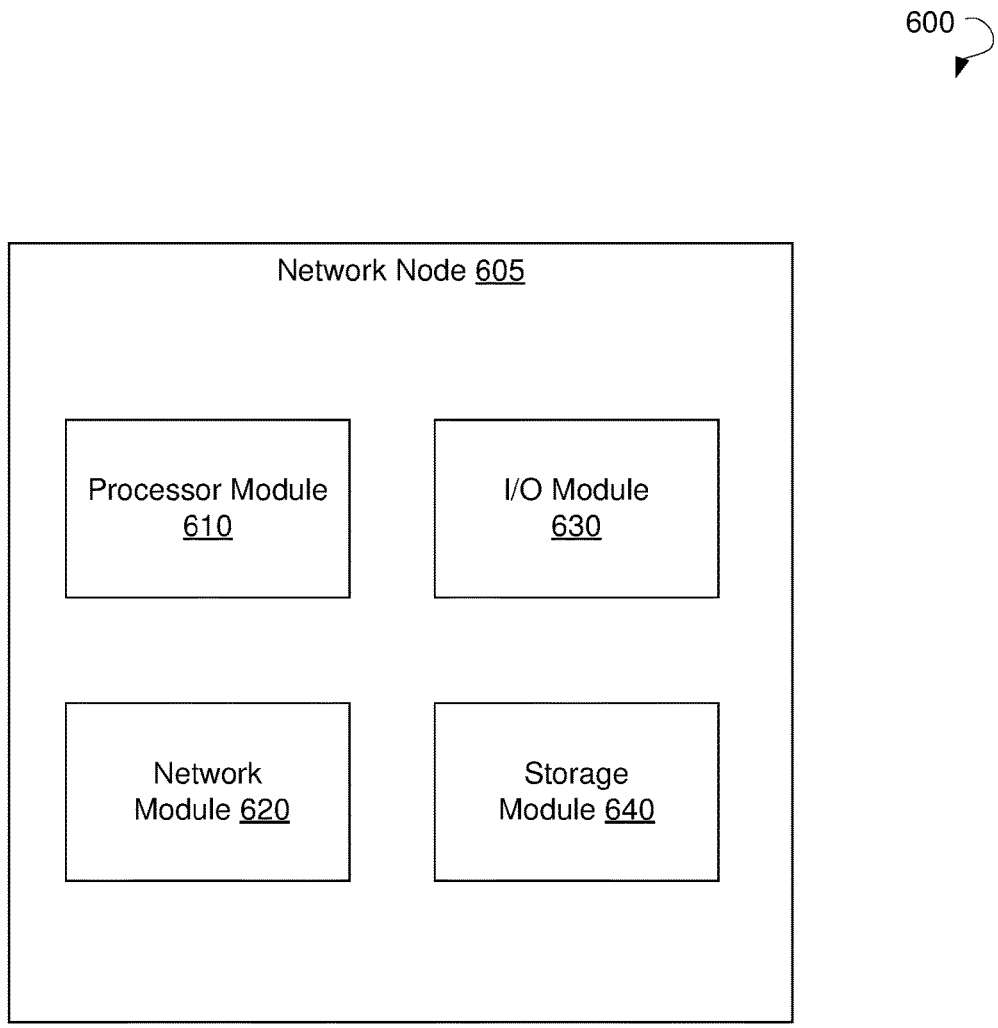
FIG. 6 is a block diagram illustrating a network node.

FIG. 6 is a block diagram 600 illustrating a network node, according to an example embodiment. A network node 605 may include a GSLB controller, an SLB, a client DNS server, a client, and a server. In an example embodiment, the network node 605 includes a processor module 610, a network module 620, an input/output (I/O) module 630, and a storage module 640. The processor module 610 may include one or more processors, such as a microprocessor, an Intel processor, an Advanced Micro Devices processor, a microprocessor without interlocked pipeline stages, an advanced restricted instruction set computer (RISC) machine-based processor, or a RISC processor. In an example embodiment, the processor module 610 may include one or more processor cores embedded in the processor module 610. In a further example embodiment, the processor module 610 may include one or more embedded processors, or embedded processing elements in a Field Programmable Gate Array, an Application Specific Integrated Circuit, or a Digital Signal Processor. In an example embodiment, the network module 620 may include a network interface such as Ethernet, an optical network interface, a wireless network interface, T1/T3 interface, a WAN interface, or a LAN interface. In a further example embodiment, the network module 620 may include a network processor. The storage module 640 may include Random-access memory (RAM), Dynamic Random Access Memory, Static Random Access Memory, Double Data Rate Synchronous Dynamic Random Access Memory, or memory utilized by the processor module 610 or the network module 620. The storage module 640 may store data utilized by the processor module 610. In an example embodiment, the storage module 640 may include a hard disk drive, a solid state drive, an external disk, a Digital Versatile Disc (DVD), a compact disk (CD), or a readable external disk. The storage module 640 may store one or more computer programming instructions which when executed by the processor module 610 or the network module 620 may implement one or more of the functionality of the methods and systems for measuring application response delay described herein. In an example embodiment, the I/O module 630 may include a keyboard, a keypad, a mouse, a gesture-based input sensor, a microphone, a physical or sensory input peripheral, a display, a speaker, or a physical or sensual output peripheral.

Returning to FIG. 5, the GSLB controller 410 or the GSLB controller 420 may be a network node as illustrated in FIG. 6, and may be connected to the data network 510. In an example embodiment, the GSLB controller 410 or the GSLB controller 420 may include functionality of a DNS server, such as a client DNS server, so as to be able to receive and process the DNS request 515 and send the DNS response 530. In an example embodiment, the SLB 150 or the SLB 170 may be a network node as illustrated in FIG. 6 connected to the data network 510. The SLB 150 may connect to one or more servers, such as the application server 140, while the SLB 170 may connect to one or more servers, such as the application server 160. In some example embodiments, the GSLB controller 410 may include functionality of the SLB 150. The GSLB controller 410 may connect to the SLB 150 over the data network 510. In further example embodiments, the GSLB controller 410 may connect to the SLB 150 over a firewall (not shown) in the data network 510.

In a further example embodiment, the client 120 may be a network node as illustrated in FIG. 6 and may be connected to the data network 510. The client 120 may include a PC, a laptop computer, a tablet computer, a smartphone, a mobile phone, an Internet phone, a netbook, a home gateway, a broadband gateway, a network appliance, a set top box, a media server, a personal media play, a personal digital assistant, an access gateway, a networking switch, a server computer, a network storage computer, or any computing device having at least a network module and a processor module.

In an example embodiment, the application server 140 or the application server 160 may include a server network node connected to the data network 510.

In further example embodiments, the session 505 may include a data communication session to support an application communication session, such as an HTTP session, a file transfer session, a remote access session, an FTP session, a VoIP session, a SIP session, a video or audio streaming session, an e-commerce session, an enterprise application session, an email session, an online gaming session, a teleconference session, a Web-based communication session, and so forth.

In some example embodiments, the DNS request 515 sent by the client 120 may include a domain name, such as www.abc.com, mail.yahoo.com, ftp.a10networks.com, benefits.hr.company.com, or a Universal Resource Identifier identifying a network or Internet resources, such as computers, computing devices, networks, and services.

In further example embodiments, the client DNS server 130 may be a network node as illustrated on FIG. 6 and may be connected to the data network 510. The client DNS server 130 may receive the DNS request 515 and determine a domain name requested according to the DNS request 515. In further embodiments, the client DNS server 130 may include a storage for a table of domain name entries, where each entry may include a domain name and a resource record. The client DNS server 130 may match the requested domain name with the table of domain name entries. If the client DNS server 130 does not find a match of the requested domain name, the client DNS server 130 may forward the DNS request 515 to another client DNS server. In some embodiments, the GSLB controller 410 may act as another client DNS server. Therefore, the client DNS server 130 may forward the DNS request 515 to the GSLB controller 410.

The DNS response 530 may include one or more response records, such as an Internet protocol (IP) network address for the requested domain name. The response IP network address may include an IP network address or a virtual IP network address of the SLB 150 or the SLB 170. The DNS response 530 may be sent in response to the DNS request 515 and may include one or more response records for a domain name present in the DNS request 515.

The client DNS server 130 may receive the DNS response 530 from the GSLB controller 410 and may forward the DNS response 530 to the client 120. The client DNS server 130 may store the response records present in the DNS response 530 into the table of domain name entries.

In example embodiments, the response time score 520 and the response time score 525 are measured in units of time, such as milliseconds, seconds, or time units for data communication. In further example embodiments, the response time score 520 and the response time score 525 may further include a response time needed for processing the session 505 by each of the application server 140 and the application server 160.

In an example embodiment, the data network 510 may include a computing cloud, as illustrated on FIG. 1, and an Ethernet network, an ATM network, a cellular network, a wireless network, a Frame Relay network, an optical network, an IP network, or any data communication network utilizing other physical layer, link layer, or network layer capability to carry data packets.

Figure 7:
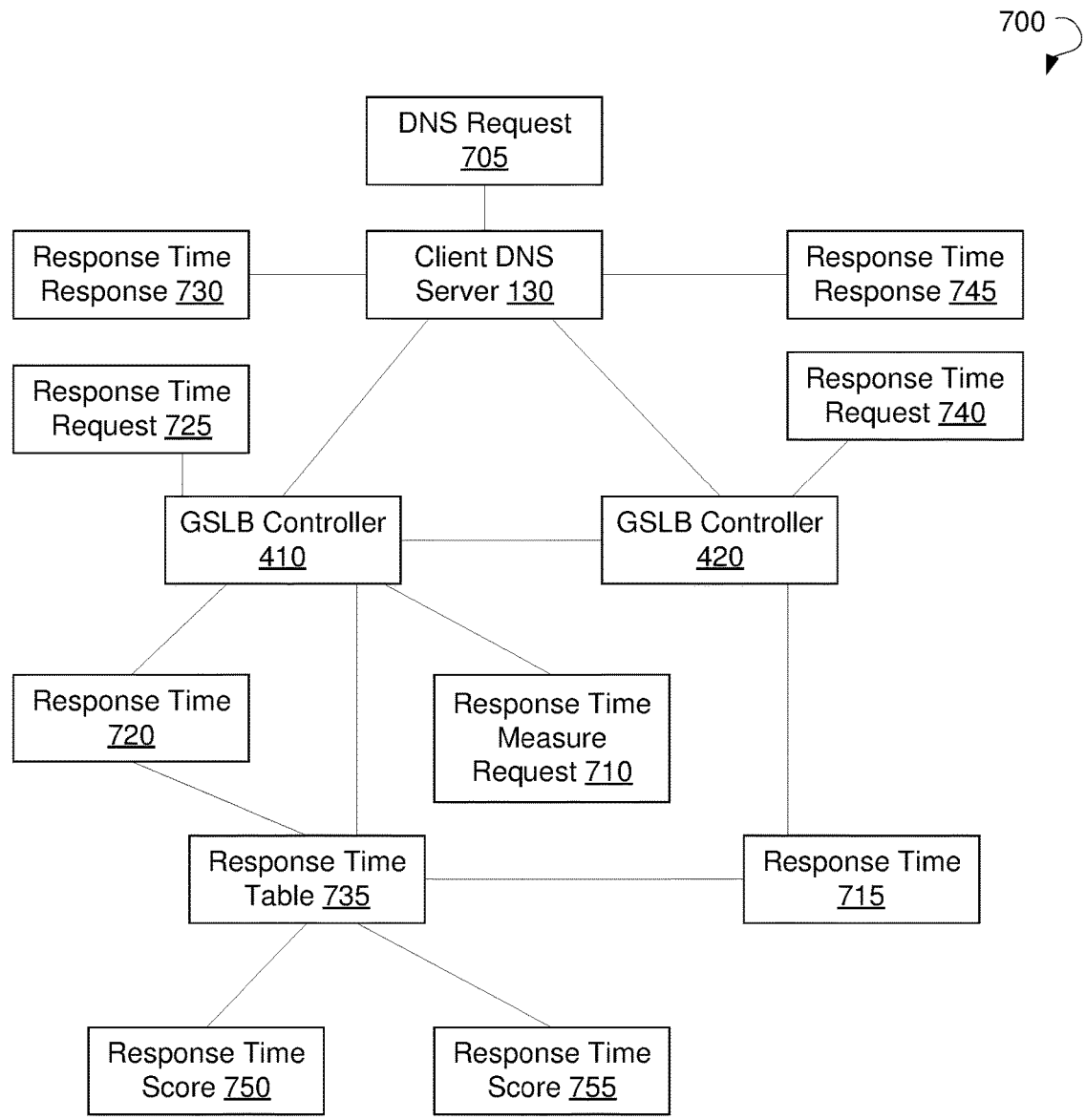
FIG. 7 is a block diagram illustrating measuring a response time delay by a system for measuring application response delay.

FIG. 7 is a block diagram 700 illustrating measuring a response time delay by a system for measuring application response delay, according to an example embodiment. The GSLB controller 410 may receive a DNS request 705 from a client DNS server 130. The GSLB controller 410 may retrieve information regarding the client DNS server 130, such as a network address of the client DNS server 130. The GSLB controller 410 may send a response time measure request 710 to the GSLB controller 420 to measure a response time 715 between the client DNS server 130 and the GSLB controller 420. In some embodiments, the GSLB controller 410 may add the DNS request 705 or information regarding the client DNS server 130, such as the network address, into the response time measure request 710. The GSLB controller 420 may retrieve the information associated with the client DNS server 130, such as the network address, from the response time measure request 710.

Moreover, the GSLB controller 410 may measure a response time 720 between the client DNS server 130 and the GSLB controller 410 by sending a response time request 725 to the client DNS server 130. In an example embodiment, the response time request 725 may be a DNS request. More specifically, the GSLB controller 410 may generate the response time request 725 as a DNS request with a predetermined domain name, such as www.abc.com. In a further example embodiment, the response time request 725 is a ping packet. The client DNS server 130 may respond to the GSLB controller 410 by sending a response time response 730. The client DNS server 130 may determine that the response time request 725 is a DNS request, resolve a domain name requested according to the response time request 725, and send the response record in the response time response 730. In other example embodiments, the client DNS server 130 may determine that the response time request 725 is a ping packet and respond with a ping response in response time response 730.

The GSLB controller 410 may calculate the response time 720 as a difference of time between a time of sending the response time request 725 and a time of receiving the response time response 730. The GSLB controller 410 may have a response time table 735 and may store the response time 720 in the response time table 735.

The GSLB controller 420 may receive the response time measure request 710 from the GSLB controller 410 and may measure the response time 715. The GSLB controller 420 may obtain the information associated with the client DNS server 130 from the response time measure request 710 and may send a response time request 740 to the client DNS server 130. The client DNS server 130 may respond to the response time request 740 by sending a response time response 745 to the GSLB controller 420. The GSLB controller 420 may calculate the response time 715 as a difference of time between a time of sending the response time request 740 and a time of receiving the response time response 745. The GSLB controller 420 may send the response time 715 to the GSLB controller 410. The GSLB controller 410 may receive the response time 715 from the GSLB controller 420 and store the response time 715 in the response time table 735.

Moreover, the GSLB controller 410 may use the response time 720 and the response time 715 obtained from the response time table 735 to calculate a response time score 750 for the GSLB controller 410 and a response time score 755 for the GSLB controller 420 according to a process of calculation of the response time score 520 and the response time score 525 illustrated on FIG. 5.

In an example embodiment, the GSLB controller 410 may not receive the response time 715 from the GSLB controller 420 within a pre-determined time after sending the response time measure request 710. In that case, the GSLB controller 410 may not calculate the response time score 755, or may generate the response time score 755 based on a pre-determined time score.

In example embodiments, the GSLB controller 410 may determine that the response time 715 for the GSLB controller 420 is already stored in the response time table 735 and may not send the response time measure request 710 to the GSLB controller 420. In this embodiment, the GSLB controller 410 may use the response time 715, which may be previously stored in the response time table 735, to calculate the response time score 755.

Figure 8:
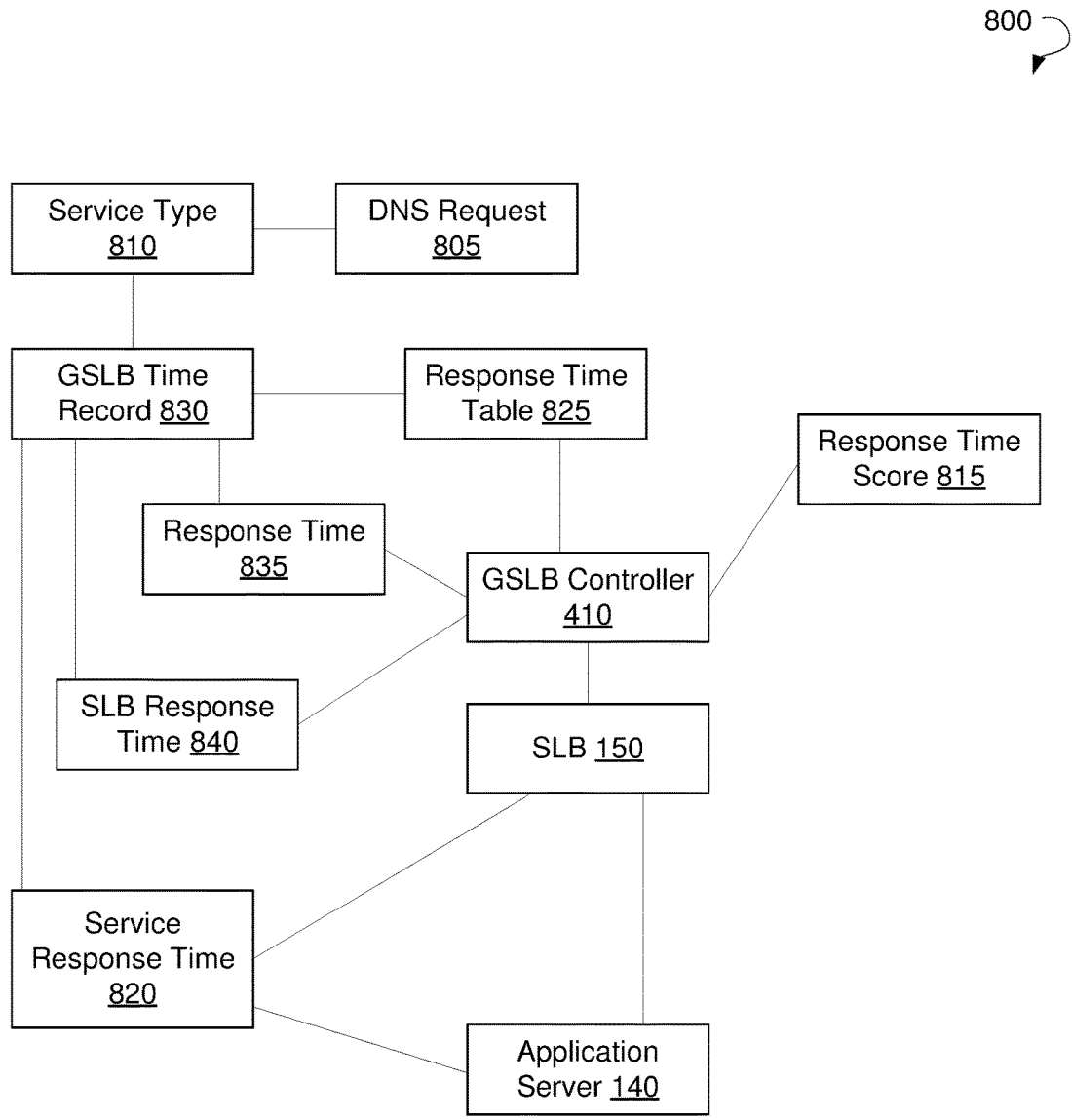
FIG. 8 is a block diagram illustrating calculation of response time based on information associated with an SLB.

FIG. 8 is a block diagram 800 illustrating calculation of a response time score based on information associated with an SLB, according to an example embodiment. The GSLB controller 410 may receive a DNS request 805. The GSLB controller 410 may determine a service type 810 based on the DNS request 805. In an example embodiment, the service type 810 is a service name or a protocol name, such as "HTTP," "FTP," "email," or "voice." The service type 810 may be associated with a type of a session requested to be established between a client and a server. The GSLB controller 410 may retrieve a domain name from the DNS request 805 and determine the service type 810 based on the retrieved domain name. In an example embodiment, the retrieved domain name includes a string, such as "http," "www," or "web." The GSLB controller 410 may determine that the service type 810 is "HTTP." In further embodiments, the retrieved domain name may include a string "ftp" or "file." Therefore, the GSLB controller 410 may determine that the service type 810 is "FTP." In a further example embodiment, the retrieved domain name includes a string "SMTP" (related to a Simple Mail Transfer Protocol), "POP" (related to a Post Office Protocol), "mail," or "exchange." The GSLB controller 410 may determine the service type 810 to be "email." In a further embodiment, the retrieved domain name includes a string "SIP" or "VoIP." The GSLB controller 410 may determine that the service type 810 is "voice."

The GSLB controller 410 may be unable to determine the service type 810 based on the DNS request 805. In this case, the GSLB controller 410 may consider the service type 810 to be "HTTP" for the DNS request 805.

The GSLB controller 410 may connect to an SLB 150 and receive a service response time 820 for the service type 810 from the SLB 150. More specifically, the GSLB controller 410 may send a request including the service type 810 to the SLB 150 requesting the SLB 150 to respond with the service response time 820 for the service type 810. The service response time 820 may include time needed for an application server associated with the SLB 150 to process the type of a session requested according to the service type 810. The SLB 150 may measure the service response time 820 and send the service response time 820 to the GSLB controller 410. The service response time 820 may further include the service type 810 for which the service response time 820 was determined. In some example embodiments, the SLB 150 may send the service response time 820 without receiving the request from the GSLB controller 410.

The GSLB controller 410 may communicate with the SLB 150 over one or more data sessions using one or more of an HTTP protocol, a JavaScript Object Notation (JSON) Representational State Transfer (REST)ful Application Programming Interface (API) over HTTP protocol, a network management protocol including a Simple Network Management Protocol, secure network protocols including a Secure Shell protocol, a Secure Sockets Layer protocol, and an IP-based session protocol. In further example embodiments, the GSLB controller 410 may communicate with the SLB 150 from time to time to receive service response time 820 for the service type 810. The GSLB controller 410 may communicate with the SLB 150 over, for example, a health-check protocol, and obtain health status information about the SLB 150 and the service response time 820. The GSLB controller 410 may regularly and from time to time send a health-check request to the SLB 150 to receive health status information of the SLB 150.

In a further example embodiment, the SLB 150 may determine that an application server 140 is operable to service the service type 810, and may request the application server 140 to provide the service response time 820. More specifically, the service response time 820 is an estimated processing time of the application server 140 for processing a session having the service type 810, such as "email," "FTP," or "voice." The service response time 820 may be measured in a time unit, such as milliseconds or seconds. The application server 140 may perform a measurement related to the service type 810 and may provide the measurement as the service response time 820 to the SLB 150. In some embodiments, the SLB 150 may sum a RTT between the SLB 150 and the application server 140 and the service response time provided by the application server 140 and determine the sum to be the service response time 820.

The SLB 150 may receive or calculate from time to time the service response 820 associated with the service type 810 for the application server 140, and may send the calculated service response time 820 from time to time to the GSLB controller 410.

The GSLB controller 410 may receive the service response time 820 and store the service response time 820 in a response time table 825. The GSLB controller 410 may receive the service response time 820 from time to time from the SLB 150 and store the newly received service response time 820 in the response time table 825.

The GSLB controller 410 may create a GSLB time record 830 in the response time table 825 to store a response time 835, which is obtained according to a process of receiving the response time 720 as illustrated in FIG. 7, and the service response time 820 into the GSLB time record 830. The GSLB controller 410 may associate the GSLB time record 830 with the GSLB controller 410, the SLB 150, and the service type 810.

The GSLB controller 410 may match the service type 810 determined from the DNS request 805 against the response time table 825 and select the GSLB time record 830 to calculate a response time score 815. The response time score 815 may be a cumulative response time, namely a sum of the response time 835 and the service response time 820.

In a further example embodiment, the GSLB controller 410 and the SLB 150 are two network nodes in a data network. The GSLB controller 410 and the SLB 150 may be separated by a firewall network node in the data network. The GSLB controller 410 may measure an SLB response time 840 associated with the SLB 150 and store the SLB response time 840 in the response time table 825. The SLB response time 840 may be a RTT of a communication between the GSLB controller 410 and the SLB 150. The GSLB controller 410 may send a request to the SLB 150 and receive a response to the request from the SLB 150. The GSLB controller 410 may measure the SLB response time 840 as a time difference between a time of sending the request to the SLB 150 and a time of receiving the response from the SLB 150. More specifically, the GSLB controller 410 may ping the SLB 150 to measure the SLB response time 840. Furthermore, the GSLB controller 410 may send a health-check request to determine a status of the SLB 150 and measure the SLB response time 840 using, for example, a heart-check protocol. The GSLB controller 410 may store the SLB response time 840 into the GSLB time record 830. The GSLB controller 410 may add the SLB response time 840 to the response time score 815.

Figure 9:
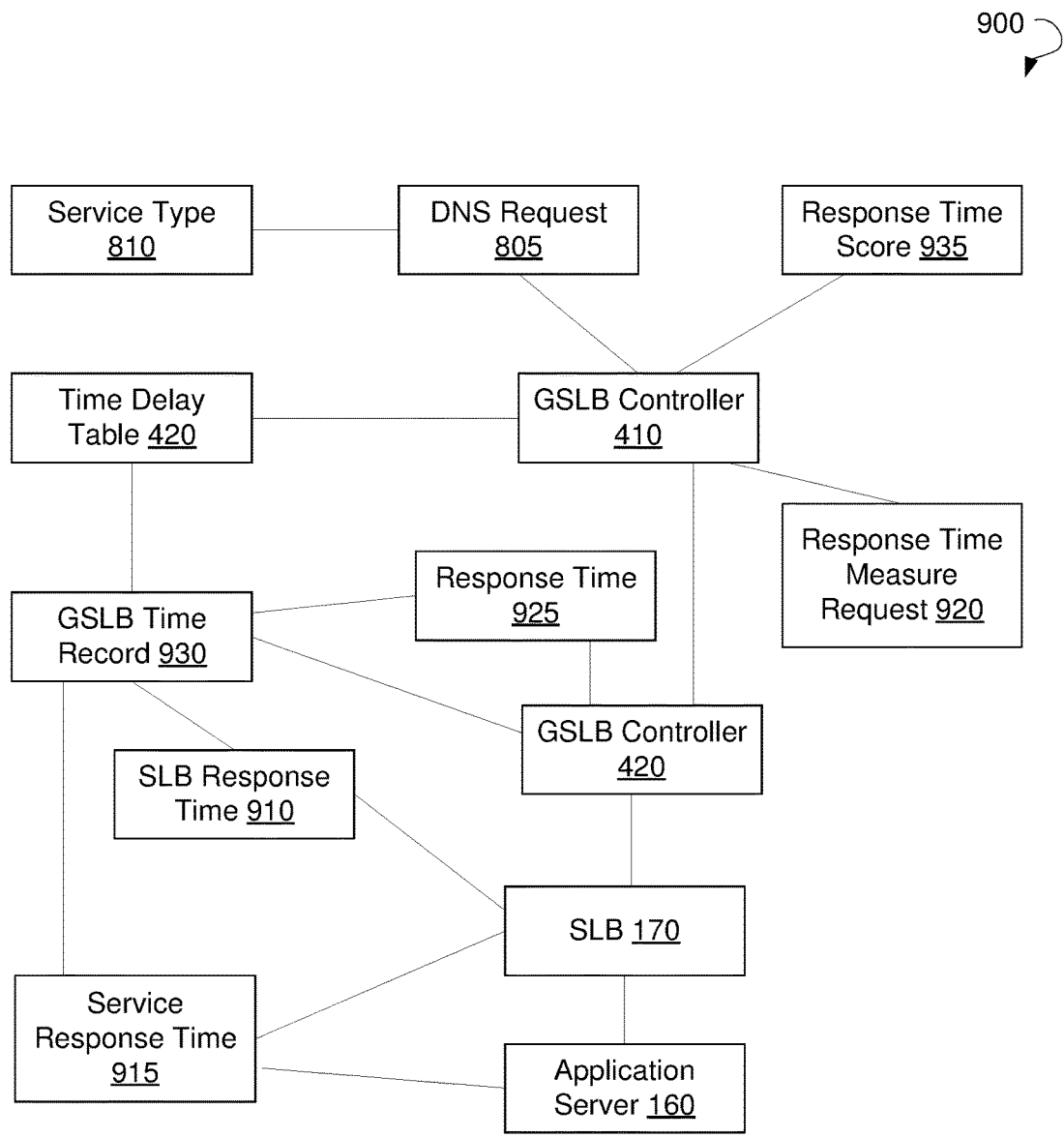
FIG. 9 is a block diagram illustrating calculation of response time associated with a second GSLB controller.

FIG. 9 is a block diagram 900 illustrating calculation of cumulative response time for a second GSLB controller, according to an example embodiment. Based on the service type 810, the GSLB controller 420 may determine SLB response time 910 and service response time 915 related to an SLB 170 and an application server 160. The GSLB controller 410 may send a response time measure request 920, which includes the service type 810, to the GSLB controller 420. The GSLB controller 420 may obtain the service type 810 from the response time measure request 920. In some example embodiments, the GSLB controller 420 may determine the service response time 915 for the service type 810 without receiving a request from the GSLB controller 410.

The GSLB controller 420 may connect to the SLB 170 and receive the service response time 915 for the service type 810 from the SLB 170. More specifically, the GSLB controller 420 may send a request including the service type 810 to the SLB 170 so as to request the SLB 170 to provide the service response time 915 for the service type 810. In response to the request, the SLB 170 may measure service response time 915 and send the measured service response time 915 to the GSLB controller 420. The service response time 915 sent by the SLB 170 may further include the service type 810 for which the service response time 915 was determined. In some example embodiments, the SLB 170 may send the service response time 915 without receiving a request from the GSLB controller 420.

The SLB 170 may determine that the application server 160 is operable to service the service type 810 and may request the application server 160 to provide the service response time 915. The application server 160 may perform a measurement related to the service type 810 and send the measurement as the service response time 915 to the SLB 170. The SLB 170 may add a RTT between the SLB 170 and the application server 160 to service response time 915, in addition to the measurement of the service response time 915 sent by the application server 160.

The SLB 170 may receive or calculate from time to time the service response time 915 for the service type 810 and send the calculated service response time 915 to the GSLB controller 420.

The GSLB controller 420 may receive the service response time 915 and send the service response time 915 to the GSLB controller 410. The GSLB controller 420 may send the service response time 915 as a response to the response time measure request 920 or may send the service response time 915 to the GSLB controller 410 upon receipt of the service response time 915 from the SLB 170.

In an example embodiment, the GSLB controller 420 and the SLB 170 may be two network nodes separated by a firewall in a data network. The GSLB controller 420 may measure the SLB response time 910 associated with the SLB 170 and send the SLB response time 910 to the GSLB controller 410. The GSLB controller 420 may send the SLB response time 910 as a response to the response time measure request 920 or may send the SLB response time 910 upon measuring the SLB response time 910. The GSLB controller 420 may measure the SLB response time 910 from time to time, or when the GSLB controller 420 detects a change in the data network connecting to the SLB 170.

In some example embodiments, the GSLB controller 420 may send response time 925, which may be measured according to the process of measuring the response time 715 as illustrated in FIG. 7, to the GSLB controller 410.

The GSLB controller 410 may create a GSLB time record 930 in the response time table 825 and associate the GSLB time record 930 with the GSLB controller 420 and the service type 810. The GSLB controller 410 may store the received response time 925, service response time 915, and SLB response time 910 into the GSLB time record 930. The GSLB controller 410 may receive one or more of the time information from GSLB controller 420 from time to time and store the received time information into the GSLB time record 930. The GSLB time record 930 may be associated with the SLB 170.

The GSLB controller 410 may match the service type 810 determined from the DNS request 805 against the response time table 825 to select the GSLB time record 930. The GSLB controller 410 may calculate a response time score 935 based on the GSLB time record 930. The response time score 935 may be a cumulative response time, namely a sum of the response time 925, the SLB response time 910, and the service response time 915. The GSLB time record 930 may not include the SLB response time 910, and the response time score 935 may be calculated as a sum of the response time 925 and the service response time 915.

The GSLB controller 410 may compare the response time score 815 and the response time score 935. If the response time score 815 is lower than the response time score 935, the GSLB controller 410 may select the SLB 150 to respond to the DNS request 805. If the response time score 935 is lower than the response time score 815, the GSLB controller 410 may select the SLB 170 to respond to the DNS request 805.

Figure 10:
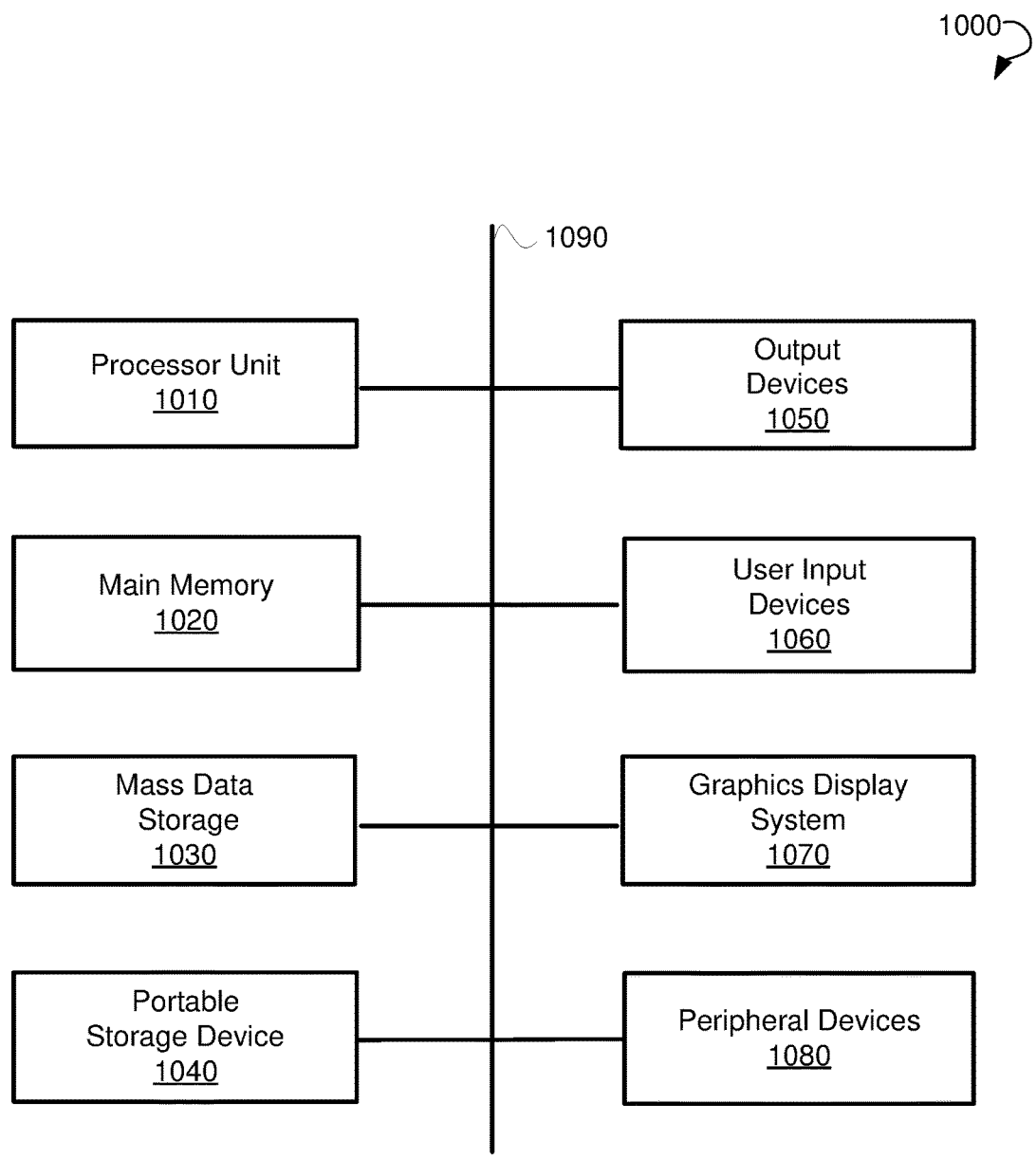
FIG. 10 shows a diagrammatic representation of a computing device for a machine, within which a set of instructions for causing the machine to perform any one or more of the methodologies discussed herein can be executed.

FIG. 10 illustrates a computer system 1000 that may be used to implement embodiments of the present disclosure, according to an example embodiment. The computer system 1000 may serve as a computing device for a machine, within which a set of instructions for causing the machine to perform any one or more of the methodologies discussed herein can be executed. The computer system 1000 can be implemented in the contexts of the likes of computing systems, networks, servers, or combinations thereof. The computer system 1000 includes one or more processor units 1010 and main memory 1020. Main memory 1020 stores, in part, instructions and data for execution by processor units 1010. Main memory 1020 stores the executable code when in operation. The computer system 1000 further includes a mass data storage 1030, a portable storage device 1040, output devices 1050, user input devices 1060, a graphics display system 1070, and peripheral devices 1080. The methods may be implemented in software that is cloud-based.

The components shown in FIG. 10 are depicted as being connected via a single bus 1090. The components may be connected through one or more data transport means. Processor units 1010 and main memory 1020 are connected via a local microprocessor bus, and mass data storage 1030, peripheral devices 1080, the portable storage device 1040, and graphics display system 1070 are connected via one or more I/O buses.

Mass data storage 1030, which can be implemented with a magnetic disk drive, solid state drive, or an optical disk drive, is a non-volatile storage device for storing data and instructions for use by processor units 1010. Mass data storage 1030 stores the system software for implementing embodiments of the present disclosure for purposes of loading that software into main memory 1020.

The portable storage device 1040 operates in conjunction with a portable non-volatile storage medium, such as a floppy disk, a CD, a DVD, or a USB storage device, to input and output data and code to and from the computer system 1000. The system software for implementing embodiments of the present disclosure is stored on such a portable medium and input to the computer system 1000 via the portable storage device 1040.

User input devices 1060 provide a portion of a user interface. User input devices 1060 include one or more microphones, an alphanumeric keypad, such as a keyboard, for inputting alphanumeric and other information, or a pointing device, such as a mouse, a trackball, stylus, or cursor direction keys. User input devices 1060 can also include a touchscreen. Additionally, the computer system 1000 includes output devices 1050. Suitable output devices include speakers, printers, network interfaces, and monitors.

Graphics display system 1070 includes a liquid crystal display or other suitable display device. Graphics display system 1070 receives textual and graphical information and processes the information for output to the display device. Peripheral devices 1080 may include any type of computer support device to add additional functionality to the computer system.

The components provided in the computer system 1000 of FIG. 10 are those typically found in computer systems that may be suitable for use with embodiments of the present disclosure and are intended to represent a broad category of such computer components that are well known in the art. Thus, the computer system 1000 can be a PC, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 1000 may be implemented as a cloud-based computing environment, such as a virtual machine operating within a computing cloud. In other embodiments, the computer system 1000 may itself include a cloud-based computing environment, where the functionalities of the computer system 1000 are executed in a distributed fashion. Thus, the computer system 1000, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1000, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for measuring application response delay have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for measuring application response delay, the system comprising at least a processor and associated memory:
a first Global Server Load Balancing (GSLB) controller associated with a plurality of distributed GSLB controllers, the first GSLB controller being utilized to:
receive, from a client, via a client Domain Name System (DNS) server, a DNS request, the DNS request including a request to establish a session between the client and one of a plurality of application servers;
responsive to the receiving the DNS request, measure a first round trip time (RTT) between the client DNS server and the first GSLB controller of the plurality of distributed GSLB controllers;
measure a second RTT between the first GSLB controller and a first server load balancer (SLB) collocated with the first GSLB controller;
measure a third RTT between the first SLB and at least one application server;
receive, from a second GSLB controller, a measurement of a first RTT between the client DNS server and the second GSLB controller, a measurement of a second RTT between the second GSLB controller and a second SLB collocated with the second GSLB controller, and a measurement of a third RTT between the second SLB and at least one further application server;
based on the measurements, calculate a cumulative response time associated with the at least one application server and a cumulative response time associated with the at least one further application server;
based on the calculation, select an application server from the at least one application server and the at least one further application server, the application server having a lowest cumulative response time from the cumulative response time associated with the at least one application server and the cumulative response time associated with the at least one further application server; and
based on the selection, send a DNS response to the client DNS server, the DNS response including network data of the SLB associated with the selected application server;
the second GSLB controller associated with the plurality of distributed GSLB controllers, the second GSLB controller being utilized to:
receive, from the first GSLB controller, an instruction to measure the first RTT between the client DNS server and the second GSLB controller, the second RTT between the second GSLB controller and the second SLB, and the third RTT between the second SLB and the at least one further application server;
in response to the instruction, measure the first RTT between the client DNS server and the second GSLB controller, the second RTT between the second GSLB controller and the second SLB, and the third RTT between the second SLB and the at least one further application server; and
provide the measurements to the first GSLB controller; and
a database for storing the measurements associated with the first GSLB controller and the measurements associated with the second GSLB controller.

2. The system of claim 1, wherein the first GSLB controller is further utilized to:
request the second GSLB controller to measure the first RTT between the client DNS server and the second GSLB controller, the second RTT between the second GSLB controller and the second SLB collocated with the second GSLB controller, and the third RTT between the second SLB and the at least one further application server.

3. The system of claim 1, wherein the calculating of the cumulative response time associated with the at least one application server includes summing the first RTT between the client DNS server and the first GSLB controller, the second RTT between the first GSLB controller and a first SLB, and third RTT between the first SLB and the at least one application server; and
wherein the calculating of the cumulative response time associated with the at least one further application server includes summing the first RTT between the client DNS server and the second GSLB controller, the second RTT between the second GSLB controller and the second SLB, and third RTT between the second SLB and the at least one further application server.

4. The system of claim 1, wherein the first GSLB controller and the second GSLB controller are utilized to exchange requests.

5. The system of claim 1, wherein the first GSLB controller is further utilized to:
determine, based on a domain name included into the DNS request, a type of the session requested to be established by the client;
request, from each of the first SLB and the second SLB, a processing time associated with each of the at least one application server and the at least one further application server, the processing time including time needed for each of the at least one application server and the at least one further application server for processing the session based on the type of the session; and
receive the processing time associated with each of the at least one application server and the at least one further application server.

6. The system of claim 5, wherein the first GSLB controller is further utilized to:
sum, for at least one application server and the at least one further application server, the cumulative response time and the processing time.

7. The system of claim 5, wherein the domain name includes a string selected from a group comprising: a Hypertext Transfer Protocol, a File Transfer Protocol, a Session Initiation Protocol, a voice over Internet protocol, a web, a file, a mail, a Post Office Protocol, an exchange, and an email.

8. The system of claim 1, wherein the first GSLB controller, the second GSLB controller, and each of the plurality of GSLB controllers are utilized to:
maintain a response time table in a database for storing the measurements and the cumulative response time.

9. The system of claim 8, wherein the first GSLB controller is further utilized to:
periodically measure a RTT between each of the plurality of GSLB controllers and each of SLBs collocated with each of the plurality of GSLB controllers; and
store the measured RTT to the database.

10. A method for measuring application response delay, the method comprising:
receiving, by a first Global Server Load Balancing (GSLB) controller associated with a plurality of distributed GSLB controllers, from a client, via a client Domain Name System (DNS) server, a DNS request, the DNS request including a request to establish a session between the client and one of a plurality of application servers;

responsive to the receiving the DNS request, measuring, by the first GSLB controller, a first round trip time (RTT) between the client DNS server and the first GSLB controller of the plurality of distributed GSLB controllers;

measuring, by the first GSLB controller, a second RTT between the first GSLB controller and a first server load balancer (SLB) collocated with the first GSLB controller;

measuring, by the first GSLB controller, a third RTT between the first SLB and at least one application server;

receiving, by the first GSLB controller, from a second GSLB controller of the plurality of distributed GSLB controllers, a measurement of a first RTT between the client DNS server and the second GSLB controller, a measurement of a second RTT between the second GSLB controller and a second SLB collocated with the second GSLB controller, and a measurement of a third RTT between the second SLB and at least one further application server;

based on the measurements, calculating, by the first GSLB controller, a cumulative response time associated with the at least one application server and a cumulative response time associated with the at least one further application server;

based on the calculation, selecting, by the first GSLB controller, an application server from the at least one application server and the at least one further application server, the application server having a lowest cumulative response time from the cumulative response time associated with the at least one application server and the cumulative response time associated with the at least one further application server; and based on the selection, sending, by the first GSLB controller, a DNS response to the client DNS server, the DNS response including network data of the SLB associated with the selected application server.

11. The method of claim 10, further comprising:
requesting, by the first GSLB controller, the second GSLB controller to measure the first RTT between the client DNS server and the second GSLB controller, the second RTT between the second GSLB controller and the second SLB collocated with the second GSLB controller, and the third RTT between the second SLB and the at least one further application server.

12. The method of claim 10, wherein the calculating of the cumulative response time associated with the at least one application server includes summing the first RTT between the client DNS server and the first GSLB controller, the second RTT between the first GSLB controller and a first SLB, and third RTT between the first SLB and the at least one application server; and wherein the calculating of the cumulative response time associated with the at least one further application server includes summing the first RTT between the client DNS server and the second GSLB controller, the second RTT between the second GSLB controller and the second SLB, and third RTT between the second SLB and the at least one further application server.

13. The method of claim 10, wherein the first GSLB controller and the second GSLB controller are operable to exchange requests.

14. The method of claim 10, further comprising:
determining, by the first GSLB controller, based on a domain name included into the DNS request, a type of the session requested to be established by the client;

requesting, by the first GSLB controller, from each of the first SLB and the second SLB, a processing time associated with each of the at least one application server and the at least one further application server, the processing time including time needed for each of the at least one application server and the at least one further application server for processing the session based on the type of the session; and receiving, by the first GSLB controller, the processing time associated with each of the at least one application server and the at least one further application server.

15. The method of claim 14, further comprising:
summing, for at least one application server and the at least one further application server, the cumulative response time and the processing time.

16. The method of claim 14, wherein the domain name includes a string selected from a group comprising: a Hypertext Transfer Protocol, a File Transfer Protocol, a Session Initiation Protocol, a voice over Internet protocol, a web, a file, a mail, a Post Office Protocol, an exchange, and an email.

17. The method of claim 10, further comprising:
maintaining, by the first GSLB controller, the second GSLB controller, and each of the plurality of GSLB controllers, a response time table in a database for storing the measurements and the cumulative response time.

18. The method of claim 17, further comprising:
based on the DNS request, searching for the cumulative response time associated with the client DNS server in the database.

19. The method of claim 17, further comprising:
periodically measuring a RTT between each of the plurality of GSLB controllers and each of SLBs collocated with each of the plurality of GSLB controllers; and
storing the measured RTT to the database.

20. A system for measuring application response delay, the system comprising at least a processor and associated memory:

a first Global Server Load Balancing (GSLB) controller associated with a plurality of distributed GSLB controllers, the first GSLB controller being utilized to:
receive, from a client, via a client DNS server, a DNS request, the DNS request including a request to establish a session between the client and one of a plurality of application servers;

responsive to the receiving the DNS request, measure a first round trip time (RTT) between the client DNS server and the first GSLB controller of the plurality of distributed GSLB controllers;

measure a second RTT between the first GSLB controller and a first server load balancer (SLB) collocated with the first GSLB controller;

measure a third RTT between the first SLB and at least one application server;

request a second GSLB controller to measure a first RTT between the client DNS server and the second GSLB controller, a second RTT between the second GSLB controller and a second SLB collocated with the second GSLB controller, and a third RTT between the second SLB and at least one further application server receive, from the second GSLB controller, a measurement of the first RTT between the client DNS server and the second GSLB controller, a measurement of the second RTT between the second GSLB controller and the second SLB collocated with the second GSLB controller, and a measurement of the third RTT between the second SLB and the at least one further application server;

based on the measurements, calculate a cumulative response time associated with the at least one application server and a cumulative response time associated with the at least one further application server;

wherein the calculating of the cumulative response time associated with the at least one application server includes summing the first RTT between the client DNS server and the first GSLB controller, the second RTT between the first GSLB controller and a first SLB, and third RTT between the first SLB and the at least one application server; and wherein the calculating of the cumulative response time associated with the at least one further application server includes summing the first RTT between the client DNS server and the second GSLB controller, the second RTT between the second GSLB controller and the second SLB, and third RTT between the second SLB and the at least one further application server;

based on the calculation, select an application server from the at least one application server and the at least one further application server, the application server having a lowest cumulative response time from the cumulative response time associated with the at least one application server and the cumulative response time the at least one further application server; and based on the selection, send a DNS response to the client DNS server, the DNS response including network data of the SLB associated with the selected application server;

the second GSLB controller associated with the plurality of distributed GSLB controllers, wherein the first GSLB controller and the second GSLB controller are utilized to exchange requests, the second GSLB controller being utilized to:

receive, from the first GSLB controller, an instruction to measure the first RTT between the client DNS server and the second GSLB controller, the second RTT between the second GSLB controller and the second SLB, and the third RTT between the second SLB and the at least one further application server;

in response to the instruction, measure the first RTT between the client DNS server and the second GSLB controller, the second RTT between the second GSLB controller and the second SLB, and the third RTT between the second SLB and the at least one further application server; and provide the measurements to the first GSLB controller; and a database for storing the measurements associated with the first GSLB controller and the measurements associated with the second GSLB controller.

* * * * *